US012056895B2

(12) United States Patent
Guldbrandsen

(10) Patent No.: US 12,056,895 B2
(45) Date of Patent: Aug. 6, 2024

(54) COMPUTER-IMPLEMENTED METHOD, DATA PROCESSING APPARATUS, AND COMPUTER PROGRAM FOR GENERATING THREE-DIMENSIONAL POSE-ESTIMATION DATA

(71) Applicant: Grazper Technologies ApS, Copenhagen K (DK)

(72) Inventor: David Guldbrandsen, Copenhagen K (DK)

(73) Assignee: Grazper Technologies ApS, Copenhagen K (DK)

( * ) Notice: Subject to any disclaimer, the term of this patent is extended or adjusted under 35 U.S.C. 154(b) by 415 days.

(21) Appl. No.: 17/643,849

(22) Filed: Dec. 13, 2021

(65) Prior Publication Data
US 2022/0262036 A1 Aug. 18, 2022

(30) Foreign Application Priority Data

Feb. 12, 2021 (EP) .................................... 21156763

(51) Int. Cl.
*G06K 9/00* (2022.01)
*G06N 20/00* (2019.01)
(Continued)

(52) U.S. Cl.
CPC .............. *G06T 7/75* (2017.01); *G06N 20/00* (2019.01); *G06T 13/40* (2013.01); *G06T 2207/30196* (2013.01)

(58) Field of Classification Search
CPC . G06T 7/75; G06T 13/40; G06T 2207/30196; G06T 2207/10016;
(Continued)

(56) References Cited

U.S. PATENT DOCUMENTS

2013/0235045 A1* 9/2013 Corazza ............... G06V 40/172
345/473
2019/0287310 A1 9/2019 Kopeinigg et al.
(Continued)

FOREIGN PATENT DOCUMENTS

WO WO-2018222756 A1 * 12/2018 ......... G02B 27/0101

OTHER PUBLICATIONS

Rempe et al. "Contact and Human Dynamics from Monocular Video", Proceedings of the European Conference on Computer Vision (ECCV), Oct. 29, 2020.
(Continued)

*Primary Examiner* — Xin Jia
(74) *Attorney, Agent, or Firm* — Kieran O'Leary; SPL Patent Attorneys PartG mbB

(57) ABSTRACT

Examples relate to a computer-implemented method, data processing apparatus and computer program for generating three-dimensional pose-estimation data. The method comprises obtaining video data of a plurality of cameras, the video data showing a movement of one or more persons, as perceived from a plurality of angles of observation. The method comprises generating two-dimensional pose-estimation data of the one or more persons using a machine-learning model that is suitable for performing two-dimensional pose-estimation based on the video data. The method comprises generating three-dimensional pose-estimation data of the one or more persons based on the two-dimensional pose-estimation data of the one or more persons. The two-dimensional and three-dimensional pose-estimation data is defined by one or more points on the body of the one or more persons. The method comprises providing an animation of the movement of the one or more persons by illustrating the movement of the one or more points on the body of the one or more persons overlaid over the video
(Continued)

data. The method comprises providing a user interface for a user to adjust the position of the one or more points on the body of the one or more persons, the user interface being based on the illustration of the movement of the one or more points that is overlaid over the video data.

16 Claims, 17 Drawing Sheets

(51) Int. Cl.
*G06T 7/73* (2017.01)
*G06T 13/40* (2011.01)

(58) Field of Classification Search
CPC . G06T 2207/20044; G06T 2207/20081; G06T 2207/20084; G06T 2207/20092; G06T 2207/30241; G06T 7/73; G06T 7/292; G06T 7/85; G06T 2207/30244; G06N 20/00
See application file for complete search history.

(56) References Cited

U.S. PATENT DOCUMENTS

2020/0097732 A1\* 3/2020 Doolittle ................ G06V 40/23
2021/0019507 A1 1/2021 Brookshire et al.
2022/0130115 A1\* 4/2022 Assouline ................ G06T 7/20

OTHER PUBLICATIONS

Schwarcz Steven et al: "3D Human Pose Estimation from Deep Multi-View 2D Pose", 2018 24th International Conference on Pattern Recognition (ICPR), IEEE, Aug. 20, 2018 (Aug. 20, 2018), pp. 2326-2331, XP033457203.
Ce Zheng et al: "Deep Learning-Based Human Pose Estimation: A Survey", Arxiv.Org, Cornell University Library, 201 OLIN Library Cornell University Ithaca, NY 14853, Dec. 24, 2020 (Dec. 24, 2020), XP081846208.

\* cited by examiner

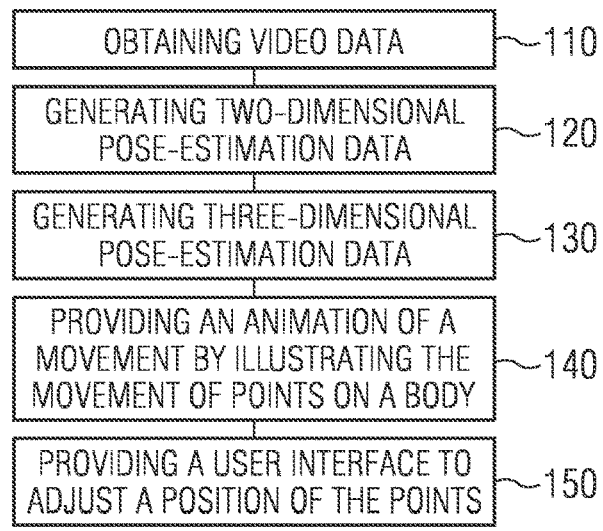
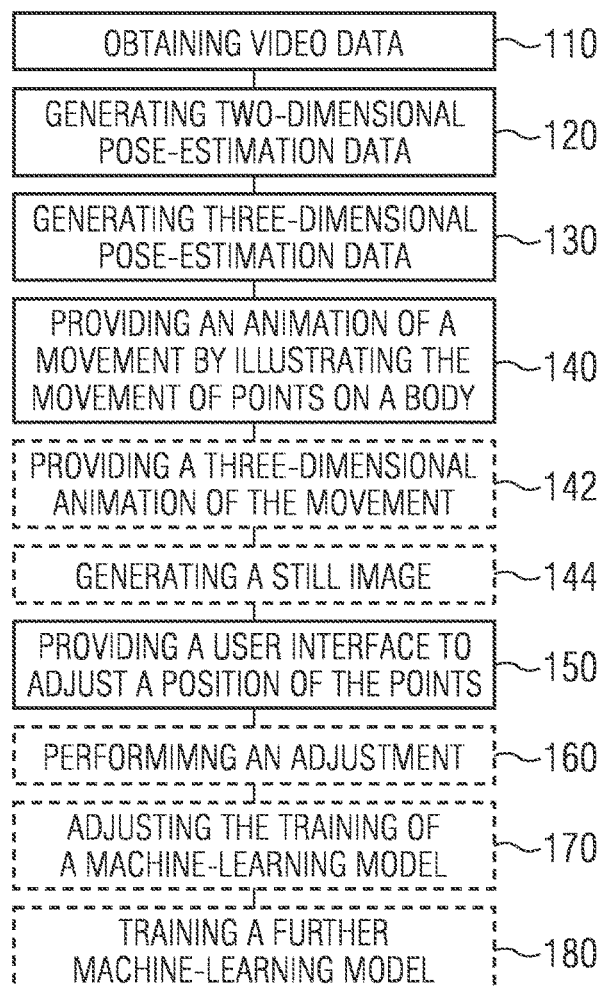

FIG. 1c-A

| FIG. 1c-A | FIG. 1c-B | FIG. 1c-C |

FIG. 1c-B
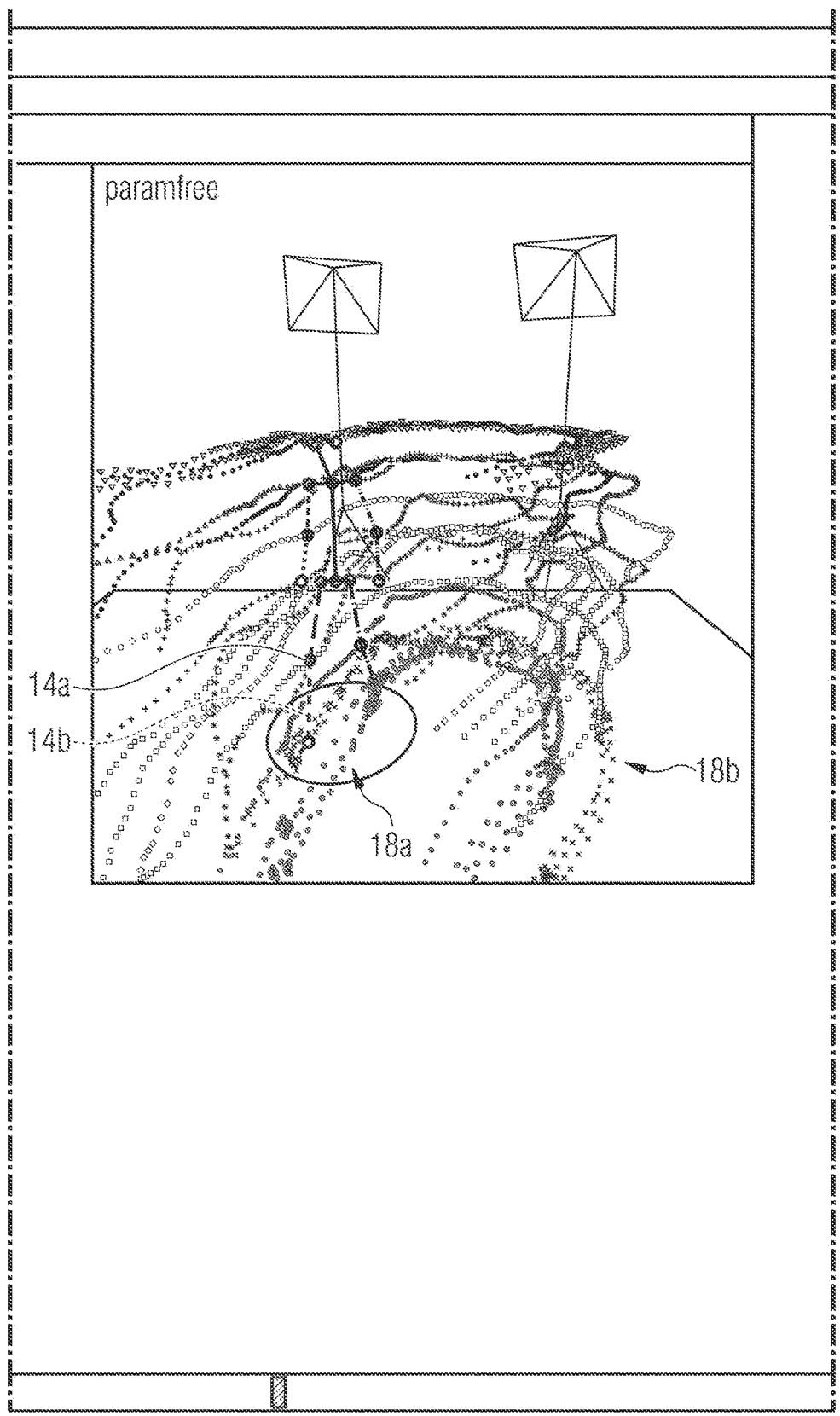

FIG. 1c-C
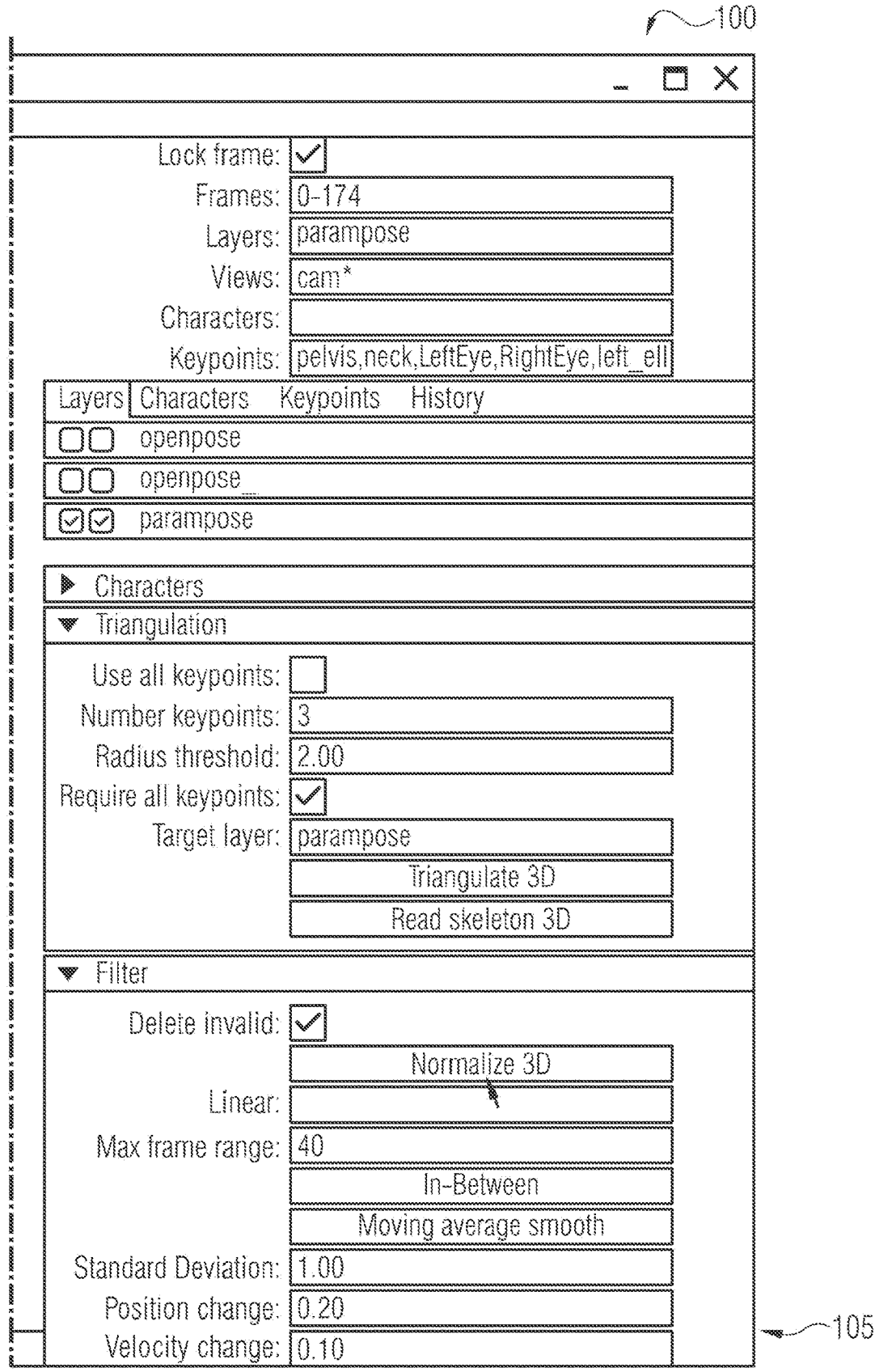

COMPUTER-IMPLEMENTED METHOD, DATA PROCESSING APPARATUS, AND COMPUTER PROGRAM FOR GENERATING THREE-DIMENSIONAL POSE-ESTIMATION DATA

CROSS-REFERENCE TO RELATED APPLICATION

This application claims priority to European Application 21156763.1, filed on Feb. 12, 2021. The contents of this earlier filed application is incorporated by reference herein in its entirety.

FIELD

Examples relate to a computer-implemented method, a data processing apparatus and a computer program for generating three-dimensional pose-estimation data based on two-dimensional video data from a plurality of cameras.

BACKGROUND

The analysis of video data with respect to the movement and poses of persons shown in the video data is a field of research of development. There are various algorithms and machine-learning-based approaches for generating three-dimensional pose-estimation data from two-dimensional video data. However, in many cases, the video data and the algorithms being used to generate the 2D and 3D pose-estimation data may result in less-than-ideal pose-estimation data, e.g., as the two-dimensional video data leaves room for a certain amount of ambiguity regarding the position of key points.

SUMMARY

Various examples of the present disclosure are based on the finding, that the extraction of two- and three-dimensional pose-estimation data from video data is often error-prone, as the points being estimated by the respective algorithms cannot be reliably estimated when they are occluded from view, e.g. hidden under clothing, from specific viewing angles etc. Instead, in ambiguous cases, approximate positions are chosen for the points, which often leads to two- and three-dimensional pose-estimation data that "vibrates" across consecutive video frames. Various examples of the present disclosure provide a concept that provides a user with efficient means to evaluate and adjust the pose-estimation data in an interactive manner, leading to a time-efficient generation of high-quality pose-estimation data, which can subsequently be used for the training of machine-learning models, for example.

Various examples of the present disclosure relate to a computer-implemented method for generating three-dimensional pose-estimation data. The method comprises obtaining video data of a plurality of cameras. The video data shows a movement of one or more persons, as perceived from a plurality of angles of observation. The method comprises generating two-dimensional pose-estimation data of the one or more persons using a machine-learning model that is suitable for performing two-dimensional pose-estimation based on the video data. The method comprises generating three-dimensional pose-estimation data of the one or more persons based on the two-dimensional pose-estimation data of the one or more persons. The two-dimensional and three-dimensional pose-estimation data is defined by one or more points on the body of the one or more persons. The method comprises providing an animation of the movement of the one or more persons by illustrating the movement of the one or more points on the body of the one or more persons overlaid over the video data. The method comprises providing a user interface for a user to adjust the position of the one or more points on the body of the one or more persons. The user interface is based on the illustration of the movement of the one or more points that is overlaid over the video data. By generating an animation of the movement, discontinuities or ambiguities across frames may become apparent to the user of the user interface. By overlaying the points over the video data, the user may be enabled to judge correspondence between the generated pose-estimation data and the underlying video data. The user interface may provide the user with a convenient and efficient way for correcting the above-mentioned discontinuities and ambiguities.

The animation may be updated and provided at various stages of the process. For example, the animation of the movement and/or the user interface may be provided and/or updated after generating the two-dimensional pose-estimation data, after generating the three-dimensional pose-estimation data, and/or after an automatic adjustment of the three-dimensional pose-estimation data. This may enable an iterative improvement of the pose-estimation data across the various stages of the process.

In some examples, the method comprises generating a still image showing the position of the one or more points during the movement over time. Such a still image may visualize temporal noise in the form of unwanted vibrations of the individual points across frames.

For example, the user interface may provide means for the user to adjust a position of individual points within the two-dimensional or three-dimensional coordinate system. This may be used by the user to correct (or add) individual points upon inspection of the animation.

In pose-estimation data, the respective persons are often represented by skeletons, which comprise joints and limbs (specialized terms that might not correspond to the anatomical meaning of the respective terms). The two-dimensional and three-dimensional pose-estimation data may be defined by a position of joints of one or more skeletons in a two-dimensional or three-dimensional coordinate system. The one or more skeletons may represent the one or more persons. The "skeletons" provide a standardized representation of the poses of the respective persons.

For example, the joints of the one or more skeletons are interconnected by a plurality of limbs. The user interface may provide means for the user to adjust at least one of a length, an angle and a position of the plurality of limbs. For example, the properties of the limbs in the pose-estimation data may be constrained by the physical properties of the respective limbs in the persons they represent.

In some examples, the method comprises automatically adjusting, using one or more adjustment algorithms, the three-dimensional pose-estimation data. For example, various types of smoothing algorithms or constraining algorithms may be used to automatically adjust the three-dimensional pose-estimation data. The animation of the movement of the one or more persons generated after automatically adjusting the three-dimensional pose-estimation data may show an effect of the adjustments performed by the one or more adjustment algorithms. Thus, the animation may be reviewed by the user to evaluate an impact of the automatic adjustments performed on the pose-estimation data.

For example, the one or more adjustment algorithms may comprise a smoothing algorithm, such as a temporal smoothing algorithm. Such algorithms may be used to reduce temporal noise in the form of unwanted vibrations of the pose-estimation data across video frames.

In general, the user interface may be used to parametrize the use of the smoothing algorithm. For example, one type of temporal smoothing algorithm is the so-called Kalman filter. The user interface may provide means for the user to adjust one or more parameters of the smoothing algorithm, e.g., of the Kalman filter.

As mentioned above, the two-dimensional and three-dimensional pose-estimation data may be defined by a position of joints of one or more skeletons in a two-dimensional or three-dimensional coordinate system, with the joints of the one or more skeletons being interconnected by a plurality of limbs. The one or more adjustment algorithms may comprise at least one algorithm that is configured to adjust the position of the joints of the limbs based on one or more constraints being applied on the plurality of limbs. For example, certain constraints, e.g., regarding the length of the limbs, or regarding physically feasible angles between limbs, may be used to automatically adjust the pose-estimation data. For example, the one or more constraints may comprise at least one constraint that relates to lengths of the plurality of limbs and/or at least one constraint that relates to an angle between limbs.

Accordingly, the user interface may provide means for the user to adjust and/or select the one or more constraints being applied on the plurality of limbs. For example, the user interface may provide means for automatically determining, means for inputting the length of limbs, and/or means for selecting which constraints are to be applied etc.

As has been mentioned above, the length of the limbs may be automatically determined by the proposed system. For example, the method may comprise estimating mean lengths of the individual limbs based on the three-dimensional pose-estimation data. In this case, the at least one constraint that relates to the lengths of the plurality of limbs may be based on the estimated mean lengths of the individual limbs.

To facilitate the evaluation of the animation by the user, with regards to the different points/joints, the points/joints may be consistently color-coded across representations. For example, each point of the one or more points or each joint of the plurality of joints may be represented by a different color that remains the same during the animation of the movement.

In general, the three-dimensional pose-estimation data may be automatically generated from the two-dimensional pose-estimation data if the positions of the cameras and the corresponding angles of observation are known by the system. For example, the three-dimensional pose-estimation data may be generated by triangulating the position of the plurality of joints based on the two-dimensional pose-estimation data and based on the plurality of angles of observation of the plurality of cameras.

To establish correspondence between the person or persons visible in the video data of the different cameras, the video data may be in, or be brought into, mutual synchronicity. In other words, the video data of the plurality of cameras may be synchronized.

In general, the three-dimensional pose-estimation data may be used for various purposes, such as the training of machine-learning models. To enable processing of the generated three-dimensional pose-estimation data, the respective data may be output. Consequently, the method may comprise outputting the three-dimensional pose-estimation data.

The generated data may be used to perform training or re-training of a machine-learning model. For example, the machine-learning model that is used to perform the two-dimensional pose-estimation may be retrained using the resulting data. For example, the method may comprise adjusting the training of the machine-learning model that is suitable for performing two-dimensional pose-estimation based on the user-adjusted position of the one or more points.

Additionally or alternatively, the data may be used to train a machine-learning model to (directly) derive three-dimensional pose-estimation data from video data from a single camera or from multiple cameras. For example, the method comprises training a further machine-learning model based on the video data and based on the three-dimensional pose-estimation data.

Various examples of the present disclosure provide a corresponding data processing apparatus comprising processing circuitry configured to carry out the above method. For example, the data processing apparatus is configured to obtain video data of a plurality of cameras. The video data shows a movement of one or more persons, as perceived from a plurality of angles of observation. The data processing apparatus is configured to generate two-dimensional pose-estimation data of the one or more persons using a machine-learning model that is suitable for performing two-dimensional pose-estimation based on the video data. The data processing apparatus is configured to generate three-dimensional pose-estimation data of the one or more persons based on the two-dimensional pose-estimation data of the one or more persons. The two-dimensional and three-dimensional pose-estimation data is defined by one or more points on the body of the one or more persons. The data processing apparatus is configured to provide an animation of the movement of the one or more persons by illustrating the movement of the one or more points on the body of the one or more persons overlaid over the video data. The data processing apparatus is configured to provide a user interface for a user to adjust the position of the one or more points on the body of the one or more persons. The user interface is based on the illustration of the movement of the one or more points that is overlaid over the video data.

Various examples of the present disclosure provide a corresponding computer program having a program code for performing the above method, when the computer program is executed on a computer, a processor, processing circuitry, or a programmable hardware component.

BRIEF DESCRIPTION OF THE FIGURES

Some examples of apparatuses and/or methods will be described in the following by way of example only, and with reference to the accompanying figures, in which FIGS. 1a and 1b show flow charts of examples of a method for generating three-dimensional pose-estimation data;

FIG. 1c shows a schematic diagram of a user interface suitable for use in generating three-dimensional pose-estimation data;

DETAILED DESCRIPTION

Figure 1C:
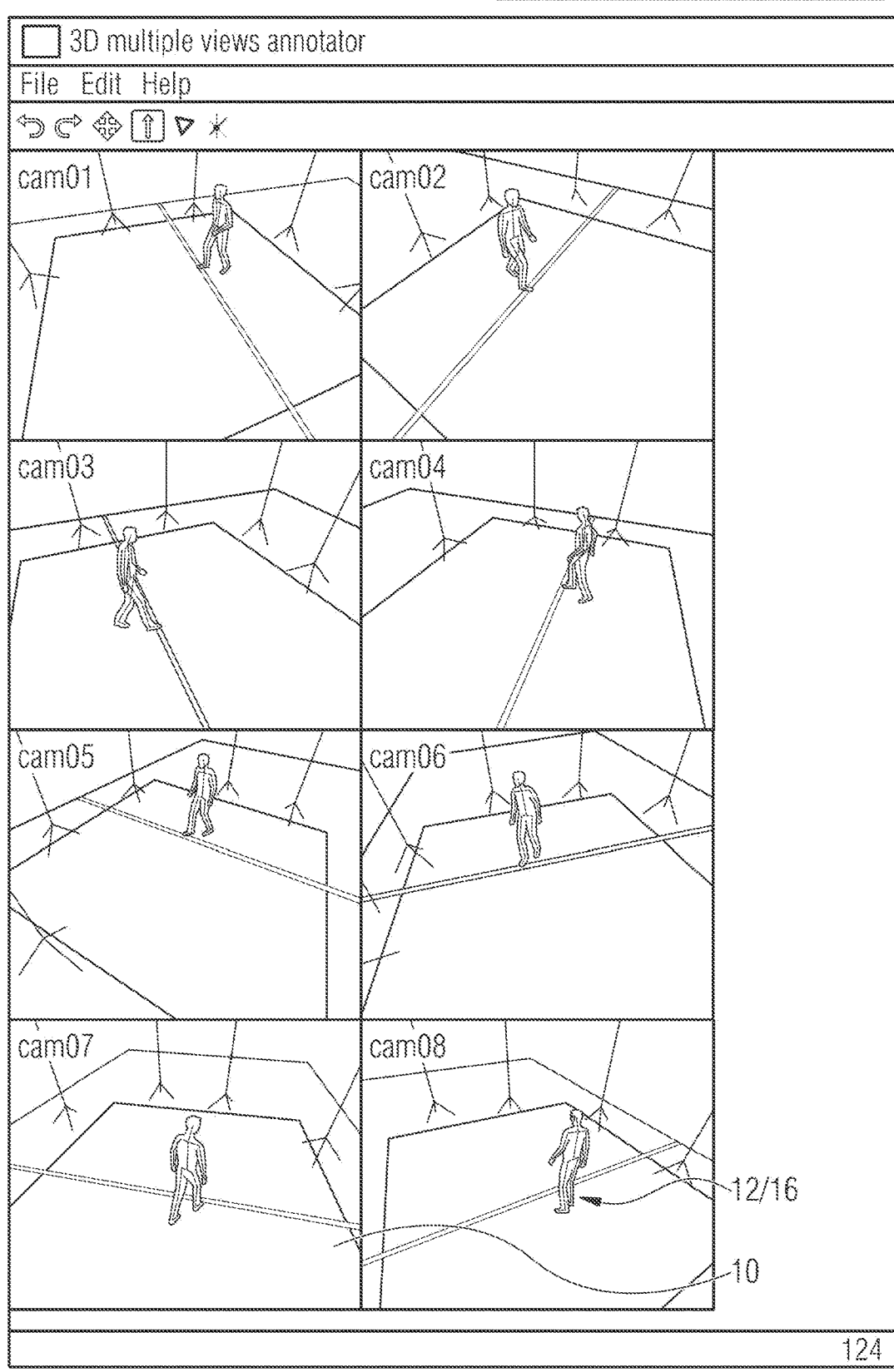
FIG. 1c is formed by the combination of partial views FIG. 1c-A, FIG. 1c-B, and FIG. 1c-C.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to an interactive concept, method, data processing apparatus and computer program for markerless three-dimensional motion capture. In general, two-dimensional video data is analyzed to estimate, in two-dimensional space, a pose of persons visible within the two-dimensional video data. The result of this estimation is then used to generate, based on knowledge regarding the angles of observation that are derived from the positioning and orientation (i.e. camera pose) of the cameras the video data originates from, corresponding three-dimensional pose estimation data. Examples may thus relate to the generation of three-dimensional human pose models from two-dimensional video frame data.

An interactive user interface is provided to aid this process, by visualizing, through an animation of the pose estimation data across frames, the quality of the pose estimation, and by providing means for automatically or manually adjusting the points that represent the estimated pose. Examples of the present disclosure in particular relate to a data editor, which interactively supports and guides the annotation of (pose-estimation) data via a user interface. The annotated data is suitable for training an estimation network, for example.

FIGS. 1a and 1b show flow charts of examples of a (computer-implemented) method for generating three-dimensional pose-estimation data. The method comprises obtaining 110 video data 10 (shown in FIG. 1c, for example) of a plurality of cameras. The video data shows a movement of one or more persons 12 (shown in FIG. 1c, for example), as perceived from a plurality of angles of observation. The method comprises generating 120 two-dimensional pose-estimation data of the one or more persons using a machine-learning model that is suitable for performing two-dimensional pose-estimation based on the video data. The method comprises generating 130 three-dimensional pose-estimation data of the one or more persons based on the two-dimensional pose-estimation data of the one or more persons. The two-dimensional and three-dimensional pose-estimation data is defined by one or more points 14a (shown in FIG. 1c, for example) on the body of the one or more persons. The method comprises providing 140 an animation 16 (shown in FIG. 1c, for example) of the movement of the one or more persons by illustrating the movement of the one or more points on the body of the one or more persons overlaid over the video data. The method comprises providing 150 a user interface for a user to adjust the position of the one or more points on the body of the one or more persons. The user interface is based on the illustration of the movement of the one or more points that is overlaid over the video data.

As mentioned above, various examples of the present disclosure relate to an editor that supports the generation of three-dimensional pose-estimation data from video data. This editor, with a corresponding user interface, is provided by the method, computer program and data processing apparatus provided in the present disclosure. Correspondingly, the present method, computer program and data processing apparatus may provide an editor to support the generation of three-dimensional pose-estimation data from (two-dimensional) video data.

The editor introduced in connection with the present disclosure allows selecting multiple synchronized 2D-viewpoints of a person, i.e., from video data originating from multiple cameras and thus multiple angles of observation. Thus, the method comprises obtaining 110 the video data 10 of the plurality of cameras. For example, the video data may be obtained from a storage device or storage medium, e.g., a storage device 26 as introduced in connection with FIG. 2, a network storage, or a removable storage device. Alternatively, the video data may be obtained (i.e., received) from the plurality of cameras directly, and stored locally on a storage device of a computing device (e.g., the data processing apparatus 20) performing the method of FIGS. 1a and/or 1b.

As mentioned above, the video data may provide multiple synchronized 2D-viewpoints of a character (i.e., a person). In other words, the video data of the plurality of cameras may be synchronized, e.g. taken at exactly the same time. If this is not the case, i.e., if the video is not synchronized, it can be synchronized during the process. For example, the statistics and/or the key points may be changed and brought into synchronicity with the video of other cameras. In this case, the video itself might not be modified. For example, the method may comprise synchronizing the video data of the plurality of cameras, e.g., based on a movement of a person visible in the video data, based on sound recorded with the video data, or based on a synchronization signal recorded with the video data. While the focus is on multiple cameras in the present disclosure, the same principle may be applied to video data of a single camera as well. In this case, the generation of the three-dimensional pose-estimation data may be based on a machine-learning model that is trained to obtain three-dimensional pose-estimation data from two-dimensional pose-estimation data.

Figure 3A:
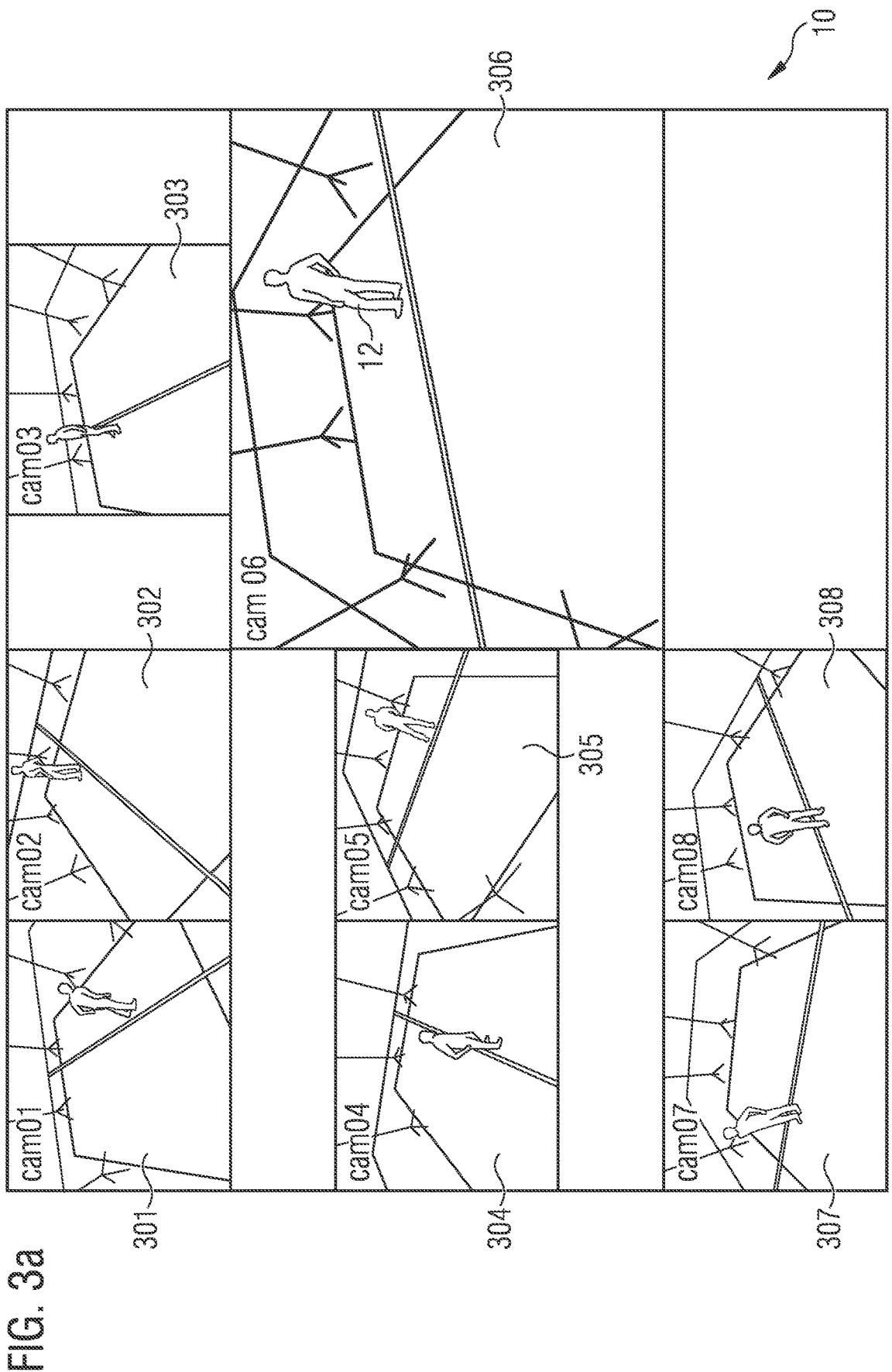
FIGS. 3a and 3b show two examples of a user interface of a three-dimensional pose editor.
Figure 3B:
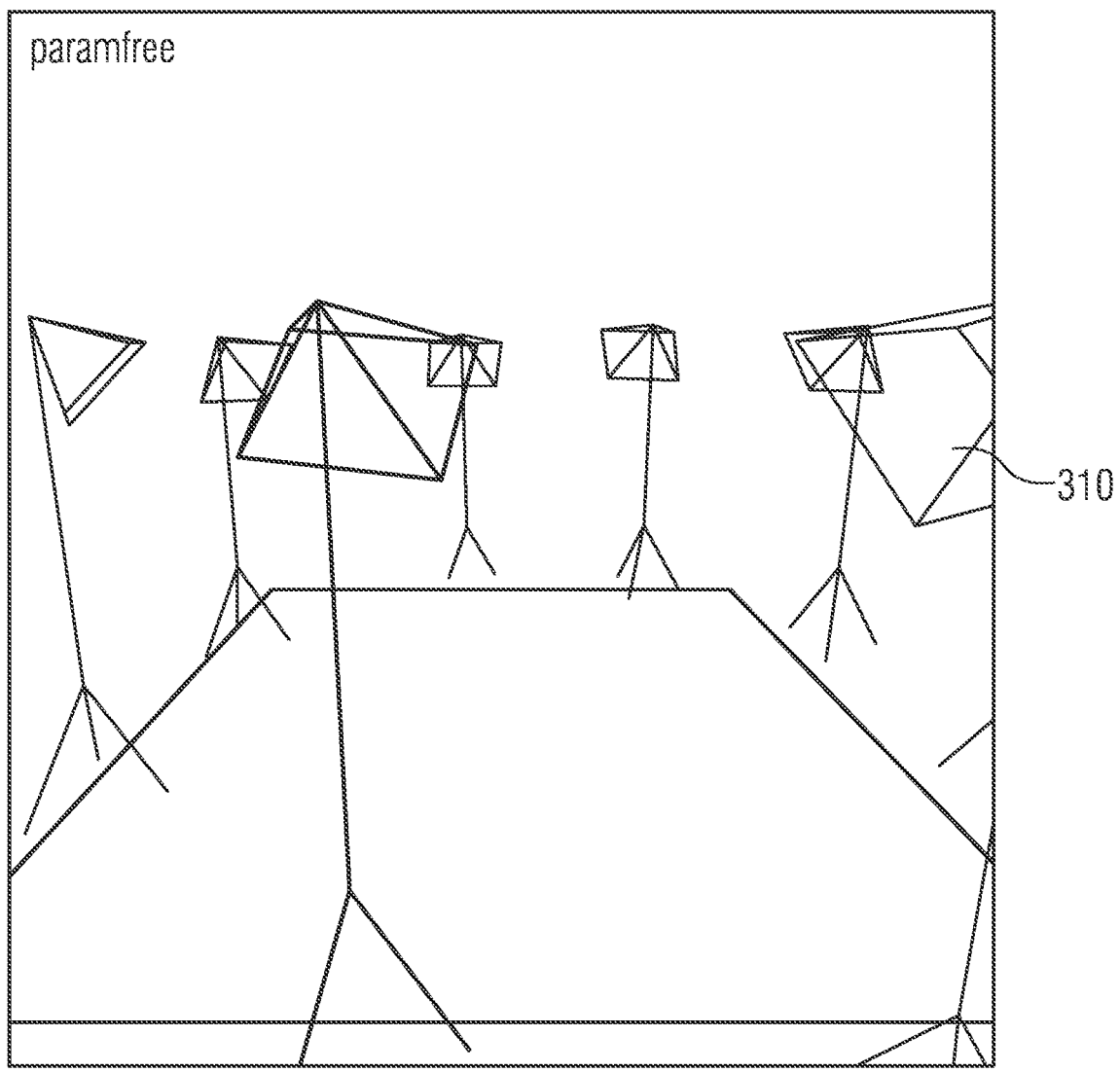

The video data shows a movement of the one or more persons 12, as perceived from a plurality of angles of observation. In general, the present concept may be used to generate the three-dimensional pose-estimation data for a single person as well as multiple different persons. An example of a single person being shown in the video data is shown in FIGS. 3a and 3b. The one or more persons are recorded from different angles. For example, this may be done in an enclosed space, e.g., a space designated for recording the movement of persons, as shown in FIGS. 3a and 3b. In FIG. 3a, a person is shown moving around an enclosed space, with the plurality of cameras being arranged around the enclosed space. For example, the plurality of cameras may be located at the periphery of the enclosed space. Alternatively, the movement of the one or more persons may be recorded in an arbitrary setting, e.g., by a plurality of surveillance cameras recording an overlapping region of space. In general, the plurality of cameras may cover an overlapping region of space (i.e., a location) from the plurality of angles of observation. In other words, the plurality of angles of observation may show the same region of space (from different angles). For example, the plurality of angles of observation may show the movement of the one or more persons in a region of space, as recorded by the plurality of cameras being placed around the region of space. For example, the plurality of cameras may be located such that each of the one or more persons is shown unobstructed from at least one of the plurality of angles of observation. In general, the plurality of angles of observation may be based on a placement, a height, a pitch angle and a yaw angle of the cameras being placed around the person being recorded. Thus, the plurality of angles of observation may be based on position and orientation of the cameras being used to record the persons. The roll angle may be constant such that the direction of gravity faces downwards in the image. In various examples, the camera positions and orientations, and thus also the angles of observation, may be derived from an initial image-driven calibration process involving suitable calibration methods, such as a specialized checkerboard pattern being displayed simultaneously in front of all cameras. Such a calibration method may be refined to also provide interactive visual feedback to the operator during the calibration process.

As a first processing step, the video data is analyzed to generate the two-dimensional pose-estimation data. In other words, the method comprises generating 120 the two-dimensional pose-estimation data of the one or more persons based on the video data. The (two-dimensional) video data is used to generate the two-dimensional pose-estimation data. For example, the two-dimensional pose-estimation data may be generated separately for the video data from each camera. In other words, the two-dimensional pose-estimation data may be defined separately for each of the plurality of angles of observation, e.g., within the same file or within different files.

In the context of the present disclosure, a machine-learning model is used for performing the two-dimensional pose-estimation. For example, the machine-learning model may be trained to generate two-dimensional pose-estimation based on the (two-dimensional) video data. For example, the video data may be used as an input for the machine-learning model, and the two-dimensional pose-estimation data may be output by the pose-estimation data. Various well-known machine-learning models may be used for the task, such as DeepPose or Deep High-Resolution Representation Learning for Human Pose Estimation (HRNet).

In general, the video data comprises, for each angle of observation, a plurality of video frames. For example, for each angle of observation, the video data may comprise at least one video file comprising the plurality of frames being recorded from the angle of observation, e.g. by one camera. For example, the machine-learning model may be trained to generate and output the two-dimensional pose-estimation data separately for each frame of the plurality of video frames (i.e., separately for each angle of observation and frame). Alternatively, the machine-learning model may be trained to generate the two-dimensional pose-estimation data across frames, e.g., by tracking the points/joints of the pose-estimation data across frames (for the same angle of observation).

The proposed approach is also suitable for handling limbs that are occluded from some of the angles of observation. For example, as a part of the triangulation process, an estimate of each limbs accuracy for each camera may be computed and used to 'inactivate' occluded cameras (e.g. per limb per person).

As mentioned above, in various examples, the video data may show multiple persons. In this case, the machine-learning model may output the two-dimensional pose-information data separately for each person. For example, the output of the machine-learning model may enumerate the persons recognized and output the coordinates of the points per person recognized. The machine-learning model that is used to generate the two-dimensional pose-estimation data may also be trained to perform person segmentation, in order to separate multiple persons visible in the video data. For example, the machine-learning model may be trained to distinguish persons using a location of the persons, a visual appearance of the person, a body pose of the persons, bone lengths of the person or using person re-identification. Visual person re-identification systems serve the purpose of distinguishing or re-identifying people, from their appearance alone.

In some cases, however, the segmentation may be performed separately based on the output of the machine-learning model, e.g., by a separate machine-learning model or by a segmentation algorithm. In other words, the method may comprise, if the video data shows multiple persons, segmenting the persons based on the output of the machine-learning model, e.g., using a separate algorithm or machine-learning model. For example, the separate algorithm may be configured, or the separate machine-learning algorithm may be trained to, distinguish persons using a location of the persons, a visual appearance of the person, a body pose of the persons, bone lengths of the person or using person re-identification.

Another algorithm (or machine-learning model) may be used to find correspondences between the different angles of observation. For example, if the video data shows multiple persons, the persons shown in the video data may be associated with each other by the algorithm or machine-learning model. For example, the method may comprise establishing correspondences between persons shown from the different angles of observation (e.g., based on the position of the persons in the frames and based on the angles of observation).

Figure 10A:
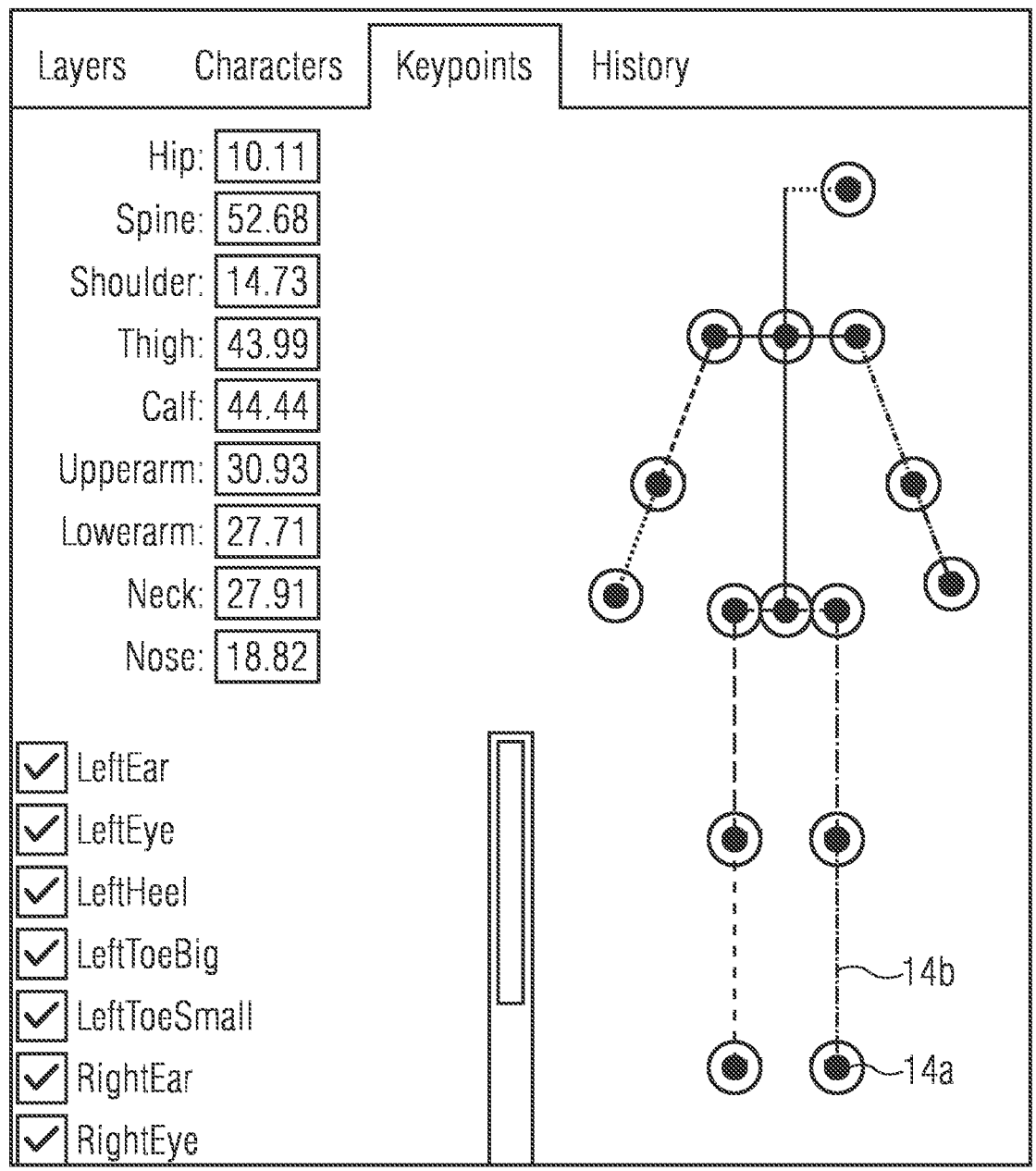
FIG. 10a shows an example of a diagram of a user interface for inputting dimensions of a skeleton for use in the generation of three-dimensional pose estimation data.

In many cases, the machine-learning model used for generating the two-dimensional pose estimation data may be trained to output a plurality of pre-defined points for each person. Key points of the character (i.e., one or more points on the body of the person), such as key points of the skeleton, can be generated automatically in the 2D models. For example, the one or more points may correspond to the joints of the skeleton. For example, the two-dimensional (and three-dimensional) pose-estimation data may be defined by a position of joints 14a of one or more skeletons in a two-dimensional or three-dimensional coordinate system, with the one or more skeletons representing the one or more persons. For example, the joints may be the points on the body of the one or more persons. Alternatively or additionally, the points on the body of the person may comprise one or more of a point corresponding to the nose of the person, two points corresponding to the eyes of the person, one or more points corresponding to the mouth of the person (e.g. two sides of the mouth may be represented by two points), one or more points corresponding to fingers of the person, one or more points corresponding to toes of the person, and one or more points representing a spine of a person. In the context of the present disclosure, the term "skeleton" might not be understood in a biological sense. Instead, the skeleton may be a pose-estimation skeleton, which is merely modeled after a "biological" skeleton. The skeleton may comprise a pre-defined plurality of joints, as shown in FIG. 5b (for the two-dimensional pose-estimation data) and 10a (for the three-dimensional pose-estimation data). For example, the same plurality of joints may be used for the two- and three-dimensional pose-estimation data. The joints of the one or more skeletons may be interconnected by a plurality of limbs 14b. Similar to above, the terms "joints" and "limbs" might not be used in their strict biological sense, but with reference to the pose-estimation skeleton referred to in the context of the present disclosure. For example, as shown in FIGS. 5b and 10a, each leg and arm of the skeleton may be represented by three joints 14a, the hip by three joints, the spine by two joints, the shoulders by three joints, and the head with the nose by two joints. The joints may be interconnected by limbs 14b. For example, the arms may be represented by the limbs "upper arm" and "lower arm", the legs by the limbs "thigh" and "calf", additionally, the limbs "hip", "spine", "shoulder", "neck" and "nose" may be part of the skeleton. The resulting skeleton is shown in FIGS. 5a to 10b.

In some examples, additional information may be provided as input to the machine-learning model. For example, in addition to the video data, information on the length of limbs of a pose-estimation skeleton of the one or more persons may be provided as input to the machine-learning model. This information on the length of the limbs may be provided via the user interface, e.g., as shown in FIG. 5b. To visualize the different joints, each joint of the plurality of joints (and each of the points on the body) may be represented by a different color. For example, the color may be the same in the graphical animation of the two- and three-dimensional pose-estimation data, and it may remain the same the same during the animation of the movement. For example, each joint of the plurality of joints (and each of the points on the body) may be represented by a different color that remains the same the same during the animation of the movement.

As mentioned above, the two-dimensional and three-dimensional pose-estimation data is defined by one or more points 14a on the body of the one or more persons. For example, the two-dimensional pose-estimation data may be output in a machine-readable format, e.g., as a JavaScript Object Notation (JSON) file. For example, for each point/joint that has been identified by the machine-learning model, the two-dimensional pose estimation data may comprise a position (e.g., coordinate) in two-dimensional space, together with information on the frame (and video data of the angle of observation) to which the position applies. Correspondingly, for each point/joint that has been identified by the machine-learning model, the three-dimensional pose estimation data may comprise a position (e.g., coordinate) in three-dimensional space, together with information on the frame (and video data of the angle of observation) to which the position applies.

From the 2D-video frames (e.g. from 8 cameras, ideally, although 1-1000 cameras would be possible, however, with a different algorithm being used if a single camera is used), 3D character information including posture information can be generated via triangulation (via the two-dimensional pose-estimation data). Thus, the method comprises generating 130 the three-dimensional pose-estimation data of the one or more persons based on the two-dimensional pose-estimation data of the one or more persons. For example, the three-dimensional pose-estimation data may be generated by triangulating the position of the one or more points or plurality of joints based on the two-dimensional pose-estimation data and based on the plurality of angles of observation of the plurality of cameras. For example, based on the angle of observation the respective two-dimensional pose-estimation data is generated from, and based on the distance between the points in the respective video frames, the corresponding three-dimensional pose-estimation data may be derived by triangulation. For example, the two-dimensional pose-estimation data representing the plurality of angles of observation may be merged to obtain a single three-dimensional representation of the pose-estimation data. Furthermore, skeleton data for the 3D model may be generated. In other words, the method may comprise generating the one or more skeletons from the plurality of joints. A single 'depth-sensing camera, e.g. a time-of-flight camera or a structured-light 3D scanner, may be used with the described interactive editor for a single-camera variation of the proposed concept.

The present concept provides an editor which allows to manually edit the 3D-pose models that have been generated from the 2D frames. The aim of the manual editing can, e.g., be to improve the 3D-model to be more plausible (i.e., "natural", "lively") to the human eye.

The proposed editor may incorporate the functionality outlined above and below. In particular, the editor may be controlled via the user interface. The method comprises providing 150 the user interface for the user. In particular, the method may comprise providing the editor, or at least the user-facing elements of the editor, for the user (including the user interface). The proposed editor may perform at least a subset of the following actions, as described above. First, the editor may load video sequences (i.e., the video data) acquired from multiple cameras. The individual videos may be processed to identify body parts and key points (i.e., points on the body) in 2D. The editor may robustly triangulate 3D positions of body parts (e.g., in a manner that is resilient to noise and occlusions).

The key points may be edited to remove jittering, e.g., to generate a smooth motion (via e.g. Kalman filter or Kalman smoother). For this, the proposed user-interface may be used, e.g., in combination with one or more automated algorithms.

The user interface may comprise at least two types of elements—visual elements for showing the video data, the one or more points (e.g., the skeletons), and the animation of the movement, and editing tools for editing the points and changing parameters. FIG. 1c is formed by the combination of partial views FIG. 1c-A, FIG. 1c-B, and FIG. 1c-C. FIG. 1c shows a schematic diagram of a user interface suitable for use in generating three-dimensional pose-estimation data. On the left, the user interface 100 comprises a view on the video data 10, overlaid with the animation 16 of the movement of the one or more persons 12.

Correspondingly, the method comprises providing 140 an animation 16 of the movement of the one or more persons 12 by illustrating the movement of the one or more points on the body of the one or more persons 12 overlaid over the video data 10. For example, the animation may illustrate a movement of the one or more points (e.g., of the joints and limbs of the skeleton), overlaid on top of (and synchronized with) the video data. The user interface may comprise (i.e., show) the animation overlaid over the video data. For example, the animation 16 may be provided separately for each of the plurality of angles of observation shown in the user interface.

Right of center, a three-dimensional animation 18a of the three-dimensional pose-estimation data is shown, together with a still image 18b showing the position of the one or more points during the movement over time. Correspondingly, the method may comprise generating/providing 142 a three-dimensional animation 18a of the three-dimensional pose-estimation data (in a three-dimensional view). The user interface may comprise the three-dimensional animation 18a of the three-dimensional pose-estimation data. The method may further comprise generating 144 the still image 18b showing the position of the one or more points during the movement over time. Correspondingly, the user interface may comprise the still image 18b showing the position of the one or more points during the movement over time. For example, as shown in FIG. 1c, for each of the frames of the video and each of the points/joints, the still image may include a representation of the respective points, with the points of (all of) the frames being shown at the same time.

On the right side of the user interface, an example of a property editor included in the example of a user interface is shown, which provides the user with means to adjust the position of the one or more points on the body of the one or more persons (in the two-dimensional and/or three-dimensional pose estimation data). Correspondingly, the method comprises providing 150 the user interface for a user to adjust the position of the one or more points on the body of the one or more persons. The user interface is based on the illustration of the movement of the one or more points that is overlaid over the video data. For example, the animation or animations 16; 18a are used to illustrate the current state of the pose-estimation data. Additionally, user interface elements may be provided that can be used to adjust the points.

As pointed out, the points/joints may be edited to remove jittering, e.g., to generate a smooth motion (via e.g. Kalman filter or Kalman smoother), e.g., manually or using automated algorithms. For example, the user interface may provide means for the user to adjust a position of individual points within the two-dimensional or three-dimensional coordinate system. Additionally or alternatively, the method may comprise automatically adjusting 160, using one or more adjustment algorithms, the two-dimensional and/or three-dimensional pose-estimation data.

For example, key points of the character (i.e., one or more points on the body of the person) may be manually amended/adjusted. For example, for each frame of the video data, the position of the points/joints may be manually adjusted using a pointing device, such as a mouse or a trackpad, or by specifying adjusted coordinates for the respective point. For example, the adjustment may be performed separately for one or more of the angles of observation (for the two-dimensional pose-estimation data), or directly in the three-dimensional pose-estimation data. In the former case, the adjusted positions may be used to directly adjust the two-dimensional pose-estimation data generated by the machine-learning model and to update the resulting three-dimensional pose-estimation data. In the latter case, the adjusted position may be used to directly adjust the three-dimensional pose-estimation data, and to back-annotate the resulting two-dimensional pose-estimation data for each of the angles of observation. In short, the method may comprise adjusting the two-dimensional and three-dimensional pose-estimation data based on the manual adjustments to the one or more points performed via the user interface.

Another way of adjusting the one or more points/the joints uses an indirect route. For example, the editor may further introduce skeleton constraints (regarding the dimensions of body parts). Skeleton data, e.g. bone length, can be entered in the 2D models and/or 3D models as well. For example, the user interface may provide means for the user to adjust at least one of a length, an angle and a position of the plurality of limbs. For example, such means are shown in FIG. 5b (for the two-dimensional pose-estimation data) and 10a (for the three-dimensional pose-estimation data). For example, as shown in the figures, for each limb, the user interface may comprise a textbox in which the length can be entered. The position of the limbs may be changed via the position of the joints. On the other hand, the position of the joints may be adjusted automatically based on the length of the limbs.

For example, the one or more adjustment algorithms may comprise at least one algorithm that is configured to adjust the position of the joints of the limbs based one or more constraints being applied on the plurality of limbs. For example, as the user interface provides means for inputting the length, position and/or angle of the respective lengths, this information may be used as constraints for the generation of the two- and/or three-dimensional pose-estimation data. For example, the one or more constraints may comprise at least one constraint that relates to lengths of the plurality of limbs and/or at least one constraint that relates to the angle between limbs. For example, in the generation of the two-dimensional or three-dimensional pose estimation data, fixed values may be assumed for a length of the limbs, or for a maximal or minimal angle between two limbs (e.g., to rule out biologically impossible (or highly unlikely)

poses). For example, the algorithm being used to generate the three-dimensional pose-estimation data may be configured to generate the three-dimensional pose-estimation data based on the two-dimensional data while taking into account the at least one constraint, e.g., in order to generate a skeleton with limbs having a static length and/or having a maximal or minimal angle between limbs. The user interface may provide means, such as one or more textboxes, for the user to adjust and/or select the one or more constraints being applied on the plurality of limbs.

In some cases, the length of the limbs of the one or more persons may be known, e.g., in a controlled setting, where a known person is recorded to generate three-dimensional pose-estimation data. In many cases, however, the length of the limbs is not previously known. In this case (and the other case as well), the dimensions of the limbs may be programmatically derived from the three-dimensional pose-estimation data. For example, the method may comprise estimating mean lengths of the individual limbs based on the three-dimensional pose-estimation data. For example, the method may comprise calculating the lengths of the individual limbs for a plurality of frames, and calculating a mean value for the length of each of the limbs. The at least one constraint that relates to the lengths of the plurality of limbs may be based on the estimated mean lengths of the individual limbs. In other words, the at least one algorithm that is configured to adjust the position of the joints of the limbs based on one or more constraints being applied on the plurality of limbs may be based on the mean value for the length of each of the limbs. The same holds true for the generation of the two-dimensional pose-estimation data—the mean value for the length of each of the limbs may be used as input for the machine-learning model (in a second run of the machine-learning model), to generate an improved version of the two-dimensional pose-estimation data.

Figure 7:
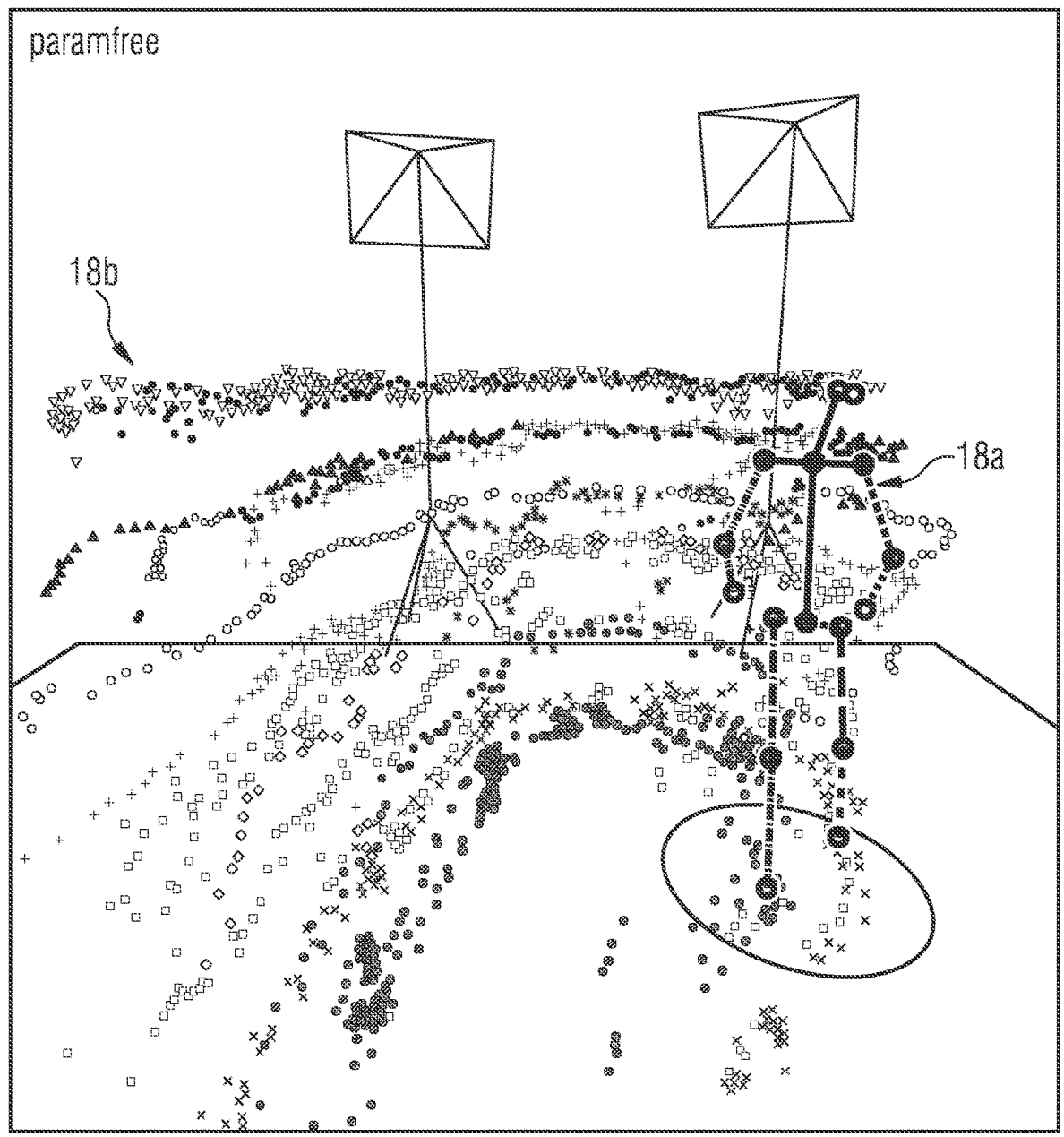
FIGS. 7 to 9 show visualizations of movement paths of joints of a skeleton, in addition to a three-dimensional animation of pose-estimation data, at various stages of adjustment.
Figure 8:
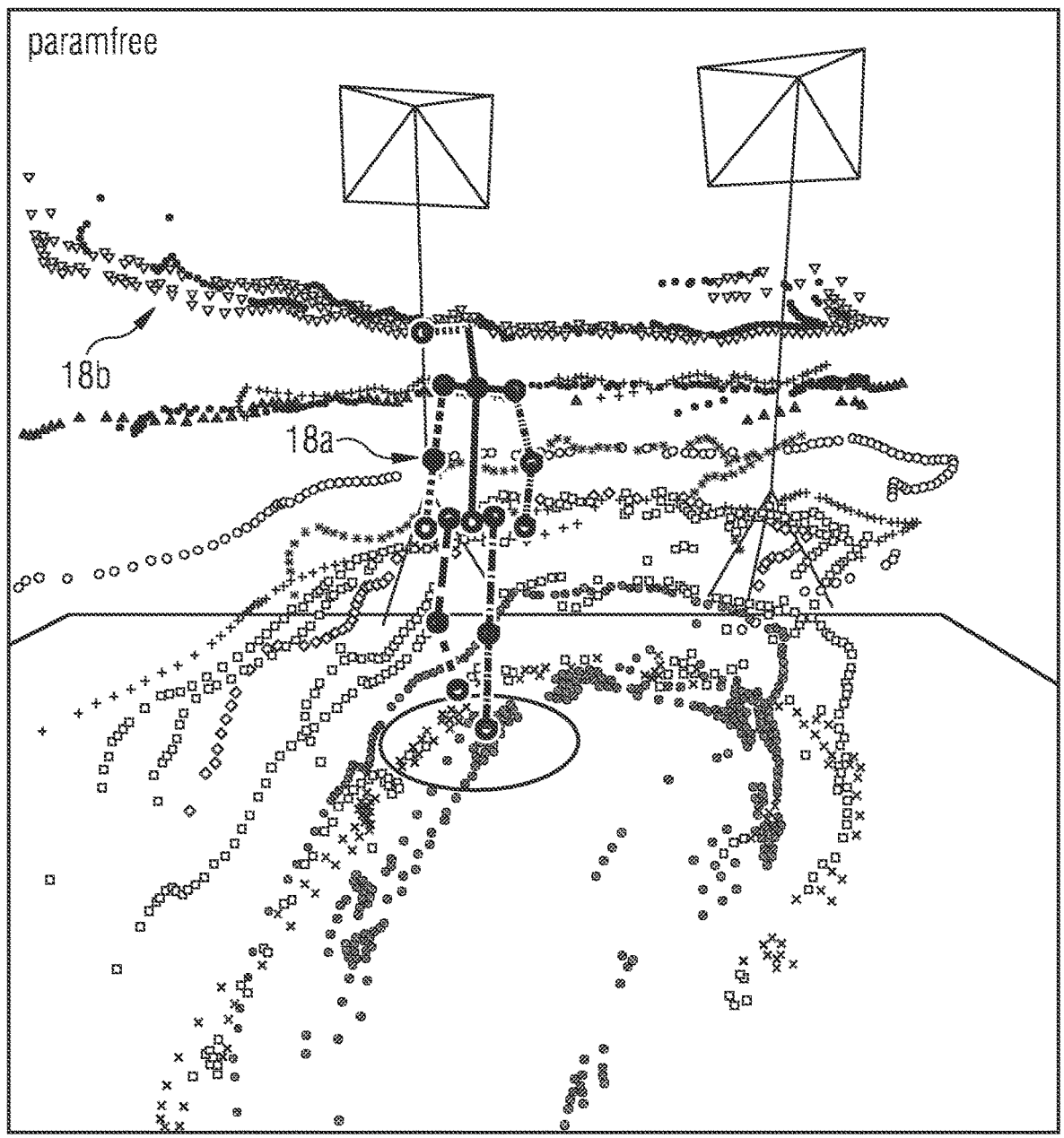
Figure 9:
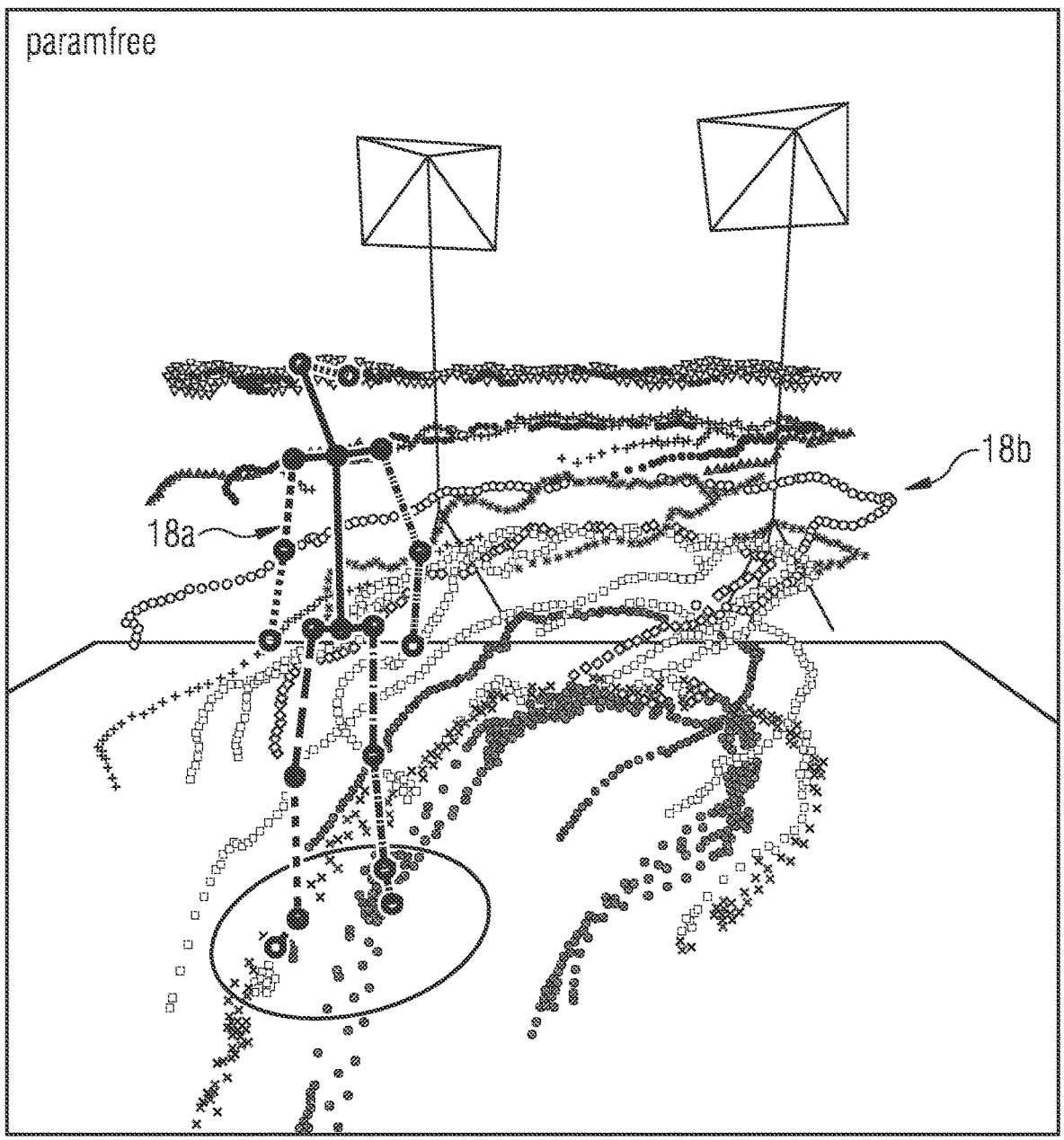

As has been pointed out above, the method may comprise automatically adjusting 160, using one or more adjustment algorithms, the three-dimensional pose-estimation data. One of the automatic adjustment algorithms pertains to the constraints that are placed on the limbs. Another type of automatic adjustment algorithm pertains to algorithms that are used to smooth the movement of the points/joints across frames. For example, the one or more adjustment algorithms may comprise a smoothing algorithm, such as a temporal smoothing algorithm. In general, a temporal smoothing algorithm may be an algorithm that is designed to smooth (i.e., reduce a difference in the position of the points/joints between subsequent frames) the movement of the points across frames (and thus across time). One smoothing algorithm that can be used is called a Kalman filter. A Kalman filter is a recursive filter, which takes a noisy input (i.e., the pose-estimation data), and estimates the state of a linear dynamic system based on the noisy input and based on the previous state of the linear dynamic system. In this case, part of the state of the linear dynamic system is the "smoothed" version of the three-dimensional pose-estimation data. For example, FIG. 7 shows an example of a still image representing the movement before applying a temporal smoothing algorithm, and FIG. 8 shows an example of a still image representing the same movement after applying a Kalman filter.

Alternatively, other types of temporal smoothing filters may be used, such as temporal smoothing filters that are based on hidden Markov models, or temporal smoothing filters that use a regression algorithm over the current, previous and/or future pose-estimation data. Regardless of the type of smoothing filter being used, the user interface may be used to control the application of the smoothing algorithm, and to control its parameters. For example, the user interface may provide means for the user to adjust one or more parameters of the smoothing algorithm, e.g., of the Kalman filter.

Such smoothing algorithms may be used to reduce the temporal noise in the form of unwanted vibrations of the movement across frames. On the other hand, the motion should not be made too smooth—the points may be manually edited to reduce a too smooth motion—too smooth motion seems unnatural to the human eye. Thus, the user interface may also be used to reduce the smoothness of a movement that is output from a filter.

Furthermore, the editor may perform generation of in-between frames (where needed for the plausible impression). In some cases, the generation of the three-dimensional pose-estimation data may fail for a subset of the frames, e.g., as an insufficient number of two-dimensional coordinates is available for at least one of the points/joints. In this case, the respective frame may be omitted during the generation of the three-dimensional pose-estimation data, e.g., to avoid incomplete skeletons. These frames may be recovered by performing interpolation of the respective frames, to recover the frames in between two complete sets of points/joints (i.e., "in-betweening"). For example, the method may comprise recovering the three-dimensional pose-estimation for a subset of the frames by interpolating between at least one previous and at least one subsequent frame.

In the context of the present disclosure, a number of actions are performed as the three-dimensional pose-estimation data is generated and refined. At any point of the process, and in particular after each processing action, the animation of the movement, which may be used to judge the quality of the pose-estimation data, may be updated. For example, the (two-dimensional and three-dimensional) animation of the movement and/or the user interface may be provided 140; 150 (or updated) after generating 120 the two-dimensional pose-estimation data, after generating 130 the three-dimensional pose-estimation data, and/or after an automatic adjustment 160 of the three-dimensional pose-estimation data. In particular, the animation of the movement of the one or more persons generated after a processing action, e.g., after generating or updating the two-dimensional pose-estimation data, after generating or updating the three-dimensional pose-estimation data, after the automatic adjustment of the three-dimensional pose-estimation data, or after a manual adjustment of the pose-estimation data, may reflect the respective processing action. For example, the animation of the movement of the one or more persons generated after generating or updating the two-dimensional pose-estimation data may show an effect of the generation or update of the two-dimensional pose-estimation data. The animation of the movement of the one or more persons generated after generating or updating the three-dimensional pose-estimation data may show an effect of the generation or update of the three-dimensional pose-estimation data. The animation of the movement of the one or more persons generated after manual changes to the pose-estimation data may show an effect of the manual changes of the pose-estimation data. Furthermore, the animation of the movement of the one or more persons generated after automatically adjusting the three-dimensional pose-estimation data may show an effect of the adjustments performed by the one or more adjustment algorithms.

In various examples, the editor may fit the 3D animation to the skeleton, and renormalize trajectories to fit to the skeleton. For example, the animation may be updated based on the two- and/or three-dimensional pose-estimation data represented by the skeleton. The editor may save the resulting animation and estimate body proportions for further external use (training, analytics, simulation or visualization purposes). In other words, the method may comprise outputting the two-dimensional and/or three-dimensional pose-estimation data.

In general, the resulting output may be used for various purposes, e.g., for determining a pose of the one or more persons shown in the video. In some examples, the resulting skeletons may even be translated onto a different person, e.g., for animation purposes. For example, the animation may be fit to a different skeleton (i.e., to change the person that is shown). The movements of the different person may appear natural as well, even though the person has not actually performed the task.

In particular, however, the resulting data may be used for the training of machine-learning models. For example, the resulting three-dimensional pose-estimation data may be used to update and/or improve the two-dimensional pose-estimation data, and to re-train the machine-learning model being used for generating the two-dimensional pose-estimation data. For example, the method may comprise adjusting 170 the training of the machine-learning model that is suitable for performing two-dimensional pose-estimation based on the user-adjusted position of the one or more points (i.e., based on the manually adjusted and/or automatically adjusted position of the points/joints).

Alternatively or additionally, a new machine-learning model may be trained to generate three-dimensional pose-estimation data directly from the video data, e.g. from video data from a single angle of observation or from video data from multiple angles of observation. In other words, the method may comprise training 180 a further machine-learning model based on the video data and based on the three-dimensional pose-estimation data.

In the following, a short introduction is given on how such training may be performed. In general, machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

In the context of the present disclosure, the machine-learning model is trained to output two-dimensional pose-estimation data based on video data. Similarly, the further machine-learning model may be trained to output three-dimensional pose-estimation data based on video data.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are.

Apart from supervised or semi-supervised learning, unsupervised learning may be used to train the machine-learning model. In unsupervised learning, (only) input data might be supplied, and an unsupervised learning algorithm may be used to find structure in the input data, e.g., by grouping or clustering the input data, finding commonalities in the data. Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

For the two machine-learning models outlined above, a supervised learning approach may be chosen. For example, for both the (re-)training of the machine-learning model and the further machine-learning model, the video data may be used as training samples. For the re-training of the machine-learning model, the (updated/improved) two-dimensional pose-estimation data may be used as desired output. Thereby, the learning does not necessarily have to start from scratch. Instead, the machine-learning model may be updated, e.g., weights of the artificial neural network of the machine-learning model may be updated, based on the (updated/improved) two-dimensional pose-estimation data. For the training of the further machine-learning model, the three-dimensional pose-estimation data may be used as desired output of the supervised learning.

Alternatively, another type of machine-learning may be used for the training of the machine-learning model or of the further machine-learning model. For example, reinforcement learning may be used, with a reward function that models the deviation of the generated pose-estimation data from the pose-estimation data being used for training.

For example, the machine-learning models may be artificial neural networks (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some embodiments, the machine-learning models may be deep neural networks, e.g., a neural network comprising one or more layers of hidden nodes (i.e., hidden layers), preferably a plurality of layers of hidden nodes.

More details and aspects of the method are mentioned in connection with the proposed concept or one or more examples described above or below (e.g., FIGS. 3 to 10b). The method may comprise one or more additional optional features corresponding to one or more aspects of the proposed concept or one or more examples described above or below.

Figure 2:
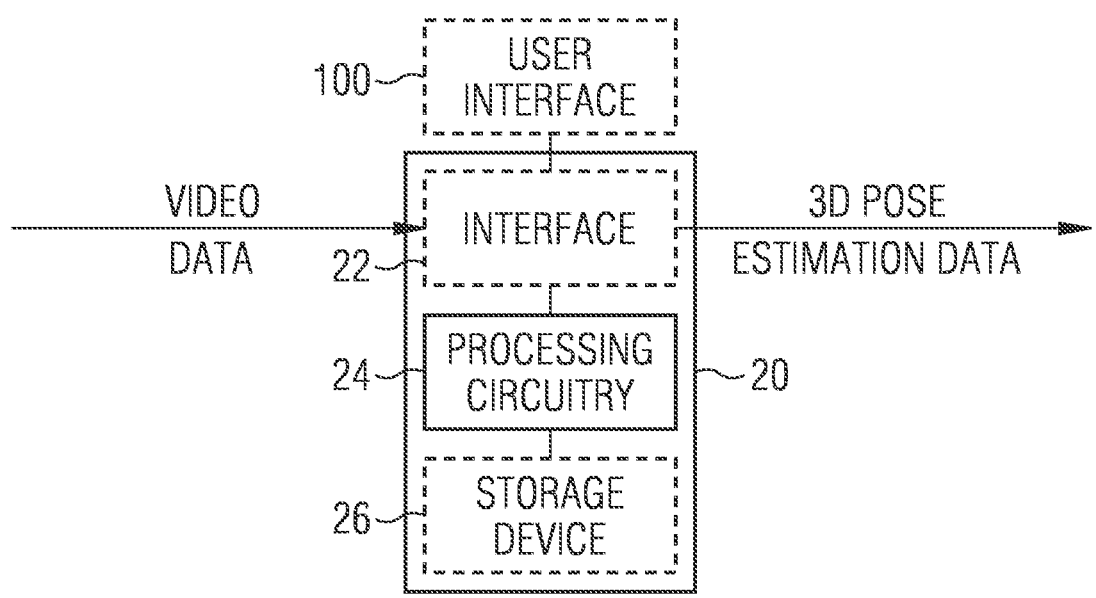
FIG. 2 shows a block diagram of a data processing apparatus for generating three-dimensional pose-estimation data.

FIG. 2 shows a block diagram of an example of a corresponding data processing apparatus 20 for generating three-dimensional pose-estimation data. The data processing apparatus comprises processing circuitry 24 configured to carry out the method introduced in connection with FIGS. 1a to 1c. Optionally, the data processing apparatus may comprise one or more additional components, such as one or more interfaces 22 and/or one or more storage devices 26. For example, the one or more interfaces 22 may be used to exchange information, to provide the user interface, and/or to receive user input. The one or more storage devices 26 may be used to store data, e.g., the video data and the pose-estimation data.

The one or more interfaces 22 may correspond to one or more inputs and/or outputs for receiving and/or transmitting information, which may be in digital (bit) values according to a specified code, within a module, between modules or between modules of different entities. For example, the one or more interfaces 22 may comprise interface circuitry configured to receive and/or transmit information.

The processing circuitry 24 may be implemented using one or more processing units, one or more processing devices, any means for processing, such as a processor, a computer or a programmable hardware component being operable with accordingly adapted software. In other words, the described function of the processing circuitry 24 may as well be implemented in software, which is then executed on one or more programmable hardware components. Such hardware components may comprise a general-purpose processor, such as a Central Processing Unit (CPU) a Digital Signal Processor (DSP), a micro-controller, etc. In some examples, the processing circuitry may comprise at least one of a General-Purpose Graphics Processing Unit (GPGPU), an Application Specific Integrated Circuitry (ASIC) for accelerating the training of machine-learning models, or a Field Programmable Gate Array (FPGA) for accelerating the training of machine-learning models.

In various examples, the one or more storage devices 26 may comprise at least one element of the group of a computer readable storage medium, such as a magnetic or optical storage medium, e.g., a hard disk drive, a flash memory, Floppy-Disk, Random Access Memory (RAM), a Read Only Memory (ROM), Programmable Read Only Memory (PROM), Erasable Programmable Read Only Memory (EPROM), an Electronically Erasable Programmable Read Only Memory (EEPROM), or a network storage.

More details and aspects of the data processing apparatus are mentioned in connection with the proposed concept or one or more examples described above or below (e.g., FIG. 1 to 1c, 4 to 10b). The data processing apparatus may comprise one or more additional optional features corresponding to one or more aspects of the proposed concept or one or more examples described above or below.

FIGS. 3a to 10b show an example of a 3D annotation tool/editor, which may be used to create training data for AI (Artificial Intelligence). It may be used to manage import capture configuration (of video data from multiple cameras). It may provide assisted annotation in multiple (camera and three-dimensional) views, such as one or more of AI-pose-estimation, triangulation (for finding 3D positions of key points), tracking of multiple characters, skeleton constraints (e.g., to remove outliers), and temporal annotation.

FIGS. 3a and 3b show two examples of views of the user interface of the 3D pose editor (i.e., the user interface for adjusting the position of the one or more points on the body of the one or more persons). In FIG. 3a, the video data 10 is shown separately 301-308 for eight cameras, showing person 12 from eight angles of observation. All of the views 301-308 from the multi-video are available within the user interface. For each view, annotations can be made either manually or automatically through calling the 2D pose inference network. In FIG. 3b, a canvas for a three-dimensional representation of the body is shown. At this point, the three-dimensional pose-estimation data has not been generated yet, so the canvas only shows the position of the cameras (see e.g., camera 310).

FIGS. 3a and 3b also provide an illustration of the different angles of observation from which the person is recorded by the cameras. In FIG. 3b, the position and orientation of the cameras around an enclosed space is shown. The cameras are placed around the enclosed space, and are oriented towards the enclosed space to record the person or persons from the different angles of observation. FIG. 3a shows the resulting view from the angles of observation, with each of the cameras providing a view on the person from a different angle of observation.

Figure 4:
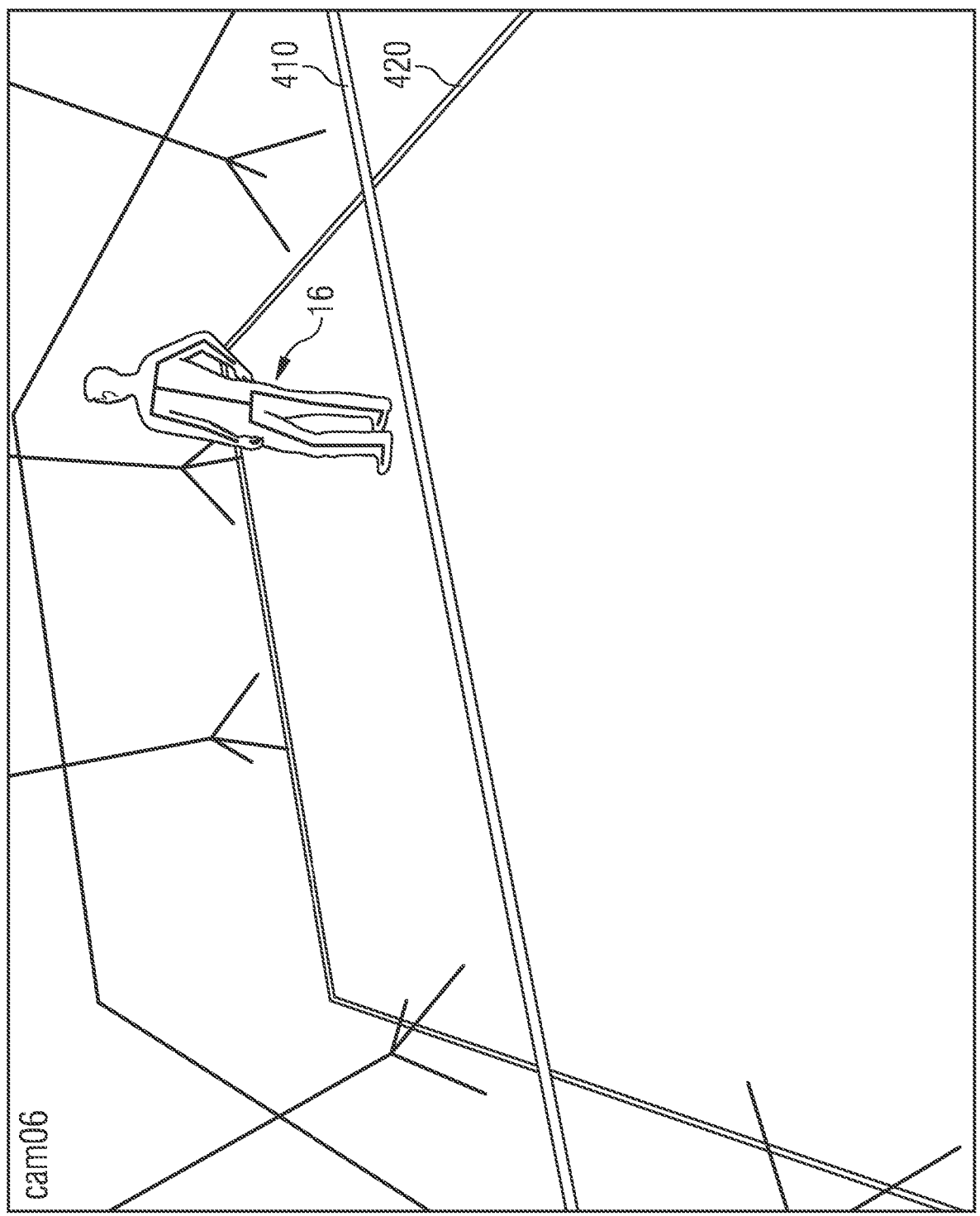
FIG. 4 shows an example of video data of a single camera.

FIG. 4 shows an example of a view of the video data of a single camera (camera 6), on which an animation 16 of the points of the body is overlaid as a skeleton. Furthermore, visual guides 410, 420 are overlaid over the video data, giving the user some orientation in between the different video views (not shown). In FIG. 4, a crude first approximation of the skeleton is now available after calling the 2D pose-estimation network (in this example, the legs are the easiest to see due to the coloring scheme). The crude poses generated by the 2D network may, in general, be less precise and may tend to "vibrate" over time. In the video views shown in FIGS. 4, 5a, 6a, a single video view is shown in isolation. However, in the user interface, (all of) the video shows may be shown in parallel, e.g., similar to FIG. 3a.

Figure 5A:
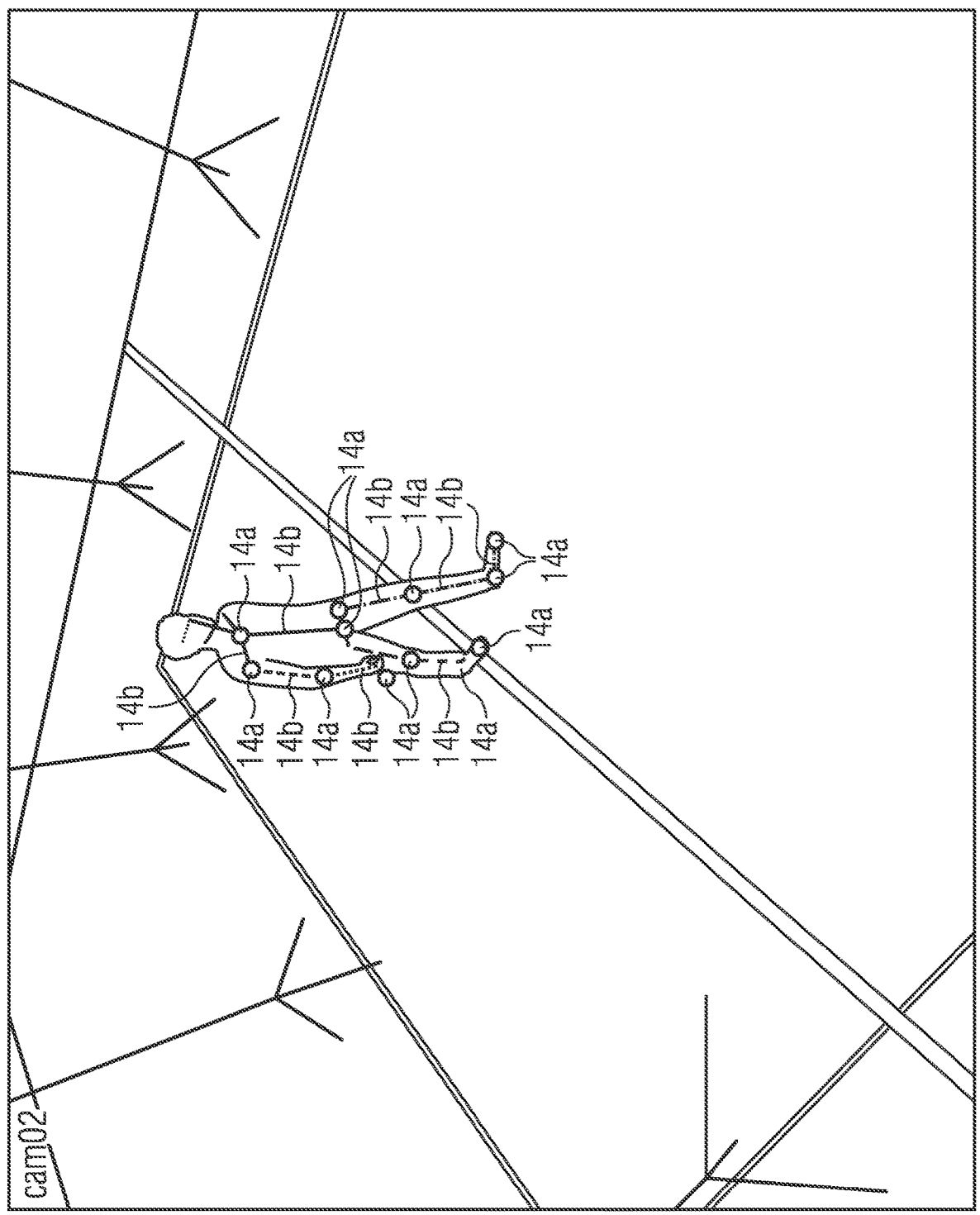
FIG. 5a shows an example of a visualization of a skeleton on top of a person in a video.
Figure 5B:
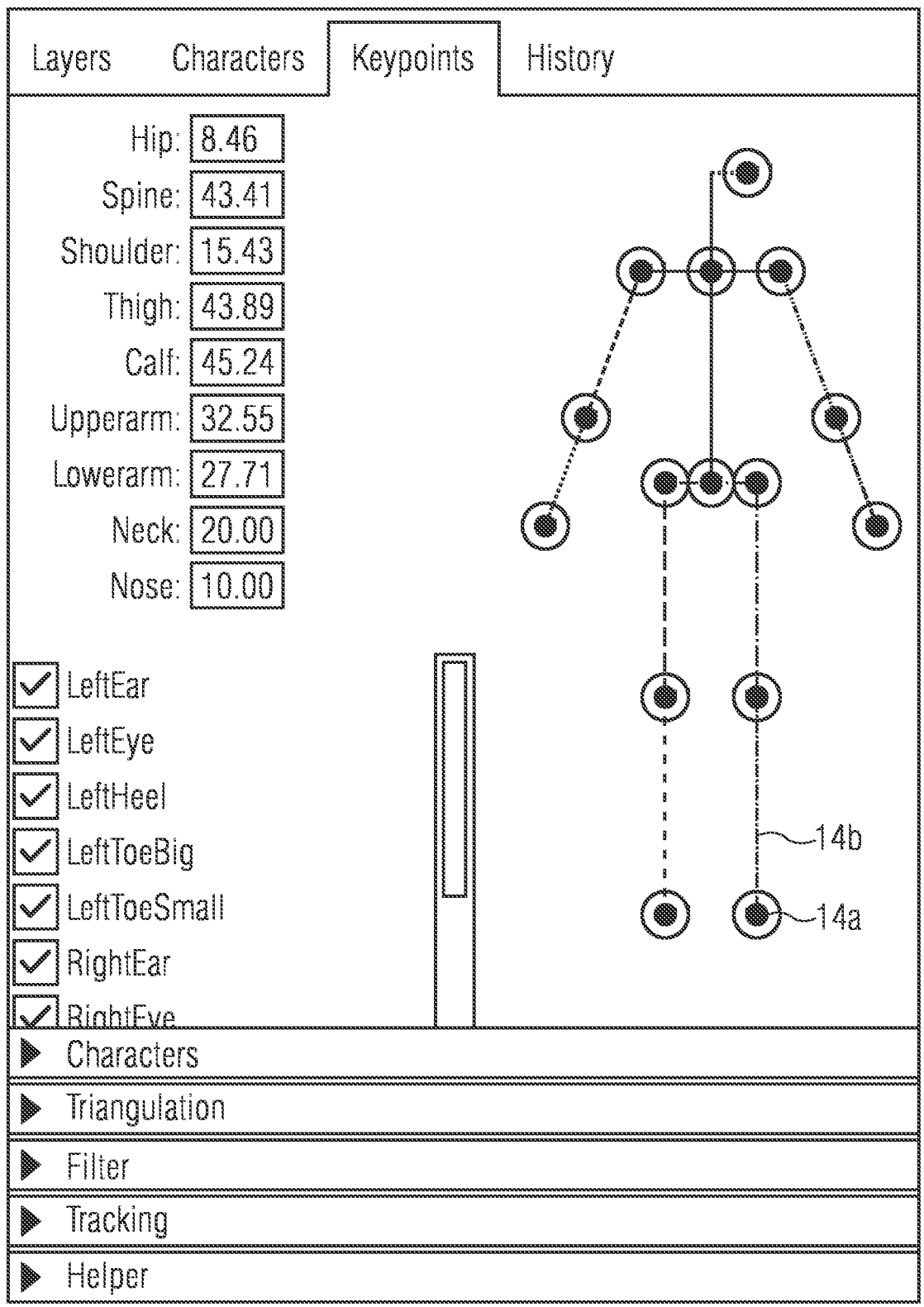
FIG. 5b shows an example of a diagram of a user interface for inputting dimensions of a skeleton for use in the generation of two-dimensional pose estimation data.

FIGS. 5a and 5b show an example of visualization and adjustment of the dimensions of the skeleton. In general, different body parts may be distinguished using different colors. For example, as shown in FIG. 5a, the skeleton that is overlaid over the person in the video view may comprise a plurality of joints 14a, which are interconnected by a plurality of limbs 14b. Each limb (and adjacent joint) may have a unique color that can be used, by the user, to quickly identify the respective body part. The dimensions of the body parts of the person can be estimated. If they are known, they can be entered in advance. In FIG. 5b, a portion of the user interface is shown, where the dimensions of the limbs can be adjusted by the user. The dimensions of the limbs may be assumed to be fixed, and used to improve the plausibility of the animation.

In various examples, the next step is triangulation. In this example, the eight 2D observations for each key point (e.g., point on the body, joint) are joined to produce an estimate of the key point's position in 3D. The user interface may be used to set certain radius thresholds and minimum limits on the number of agreeing key points that can help enforcing higher accuracy.

Figure 6A:
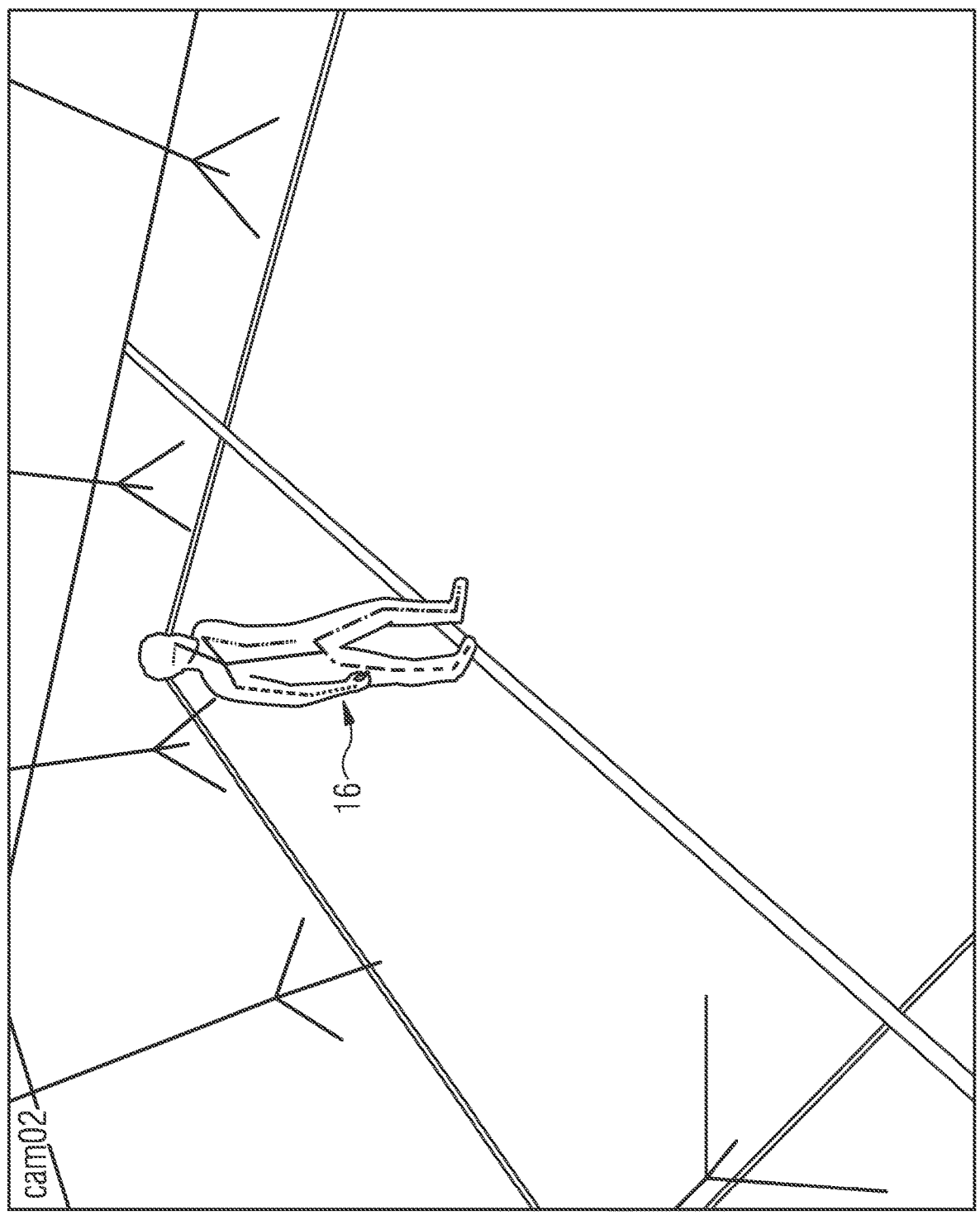
FIG. 6a shows a video view of a person overlaid with a two-dimensional version of triangulated pose-estimation data.
Figure 6B:
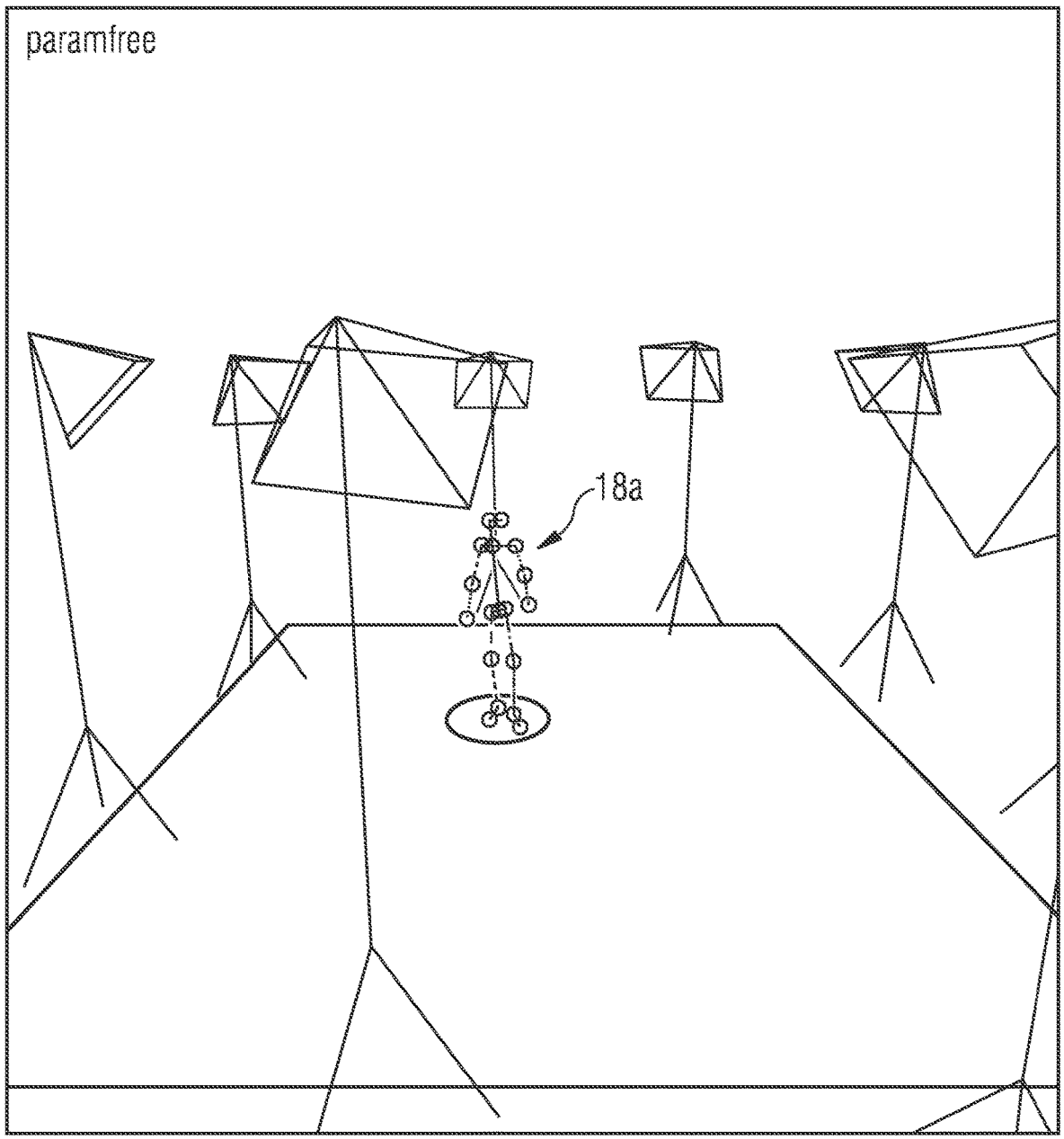
FIG. 6b shows a three-dimensional animation of triangulated pose-estimation data.

FIG. 6a shows a video view of a person overlaid with a 2D version of the triangulated pose-estimation data. After the triangulation, each of the 2D poses appear more precise. FIG. 6b shows the corresponding three-dimensional animation 18a on the canvas introduced in FIG. 3b. In some cases, the resulting animation can still appear to vibrate.

Visualizing the animation or the movement paths makes this apparent. In FIG. 7, the movement paths 18b of the joints of the skeleton is shown as a still image, in addition to the three-dimensional animation 18a of the pose-estimation data.

In some examples, the generated trajectories may be smoothened. This may be done by temporal smoothing algorithm, e.g., using a suitable variant of the Kalman filter algorithm. If the resulting motion is too smooth, the original observations can be used once more to put back the missing details. The result, as shown in FIG. 8 is a more natural and more "lively" animation (with reduced unwanted vibrations in the movement paths).

In some examples, frames may be omitted where the three-dimensional pose-estimation data could not be generated from the two-dimensional pose-estimation data, e.g., as the respective algorithms or machine-learning model were unable to locate all of the joints. Therefore, some of the frames might still be missing due to noisy observations. Using "in-betweening", the missing poses may be. The result, shown in FIG. 9, yields a smooth animation for all frames, which may be considered to be ready for use.

Figure 10B:
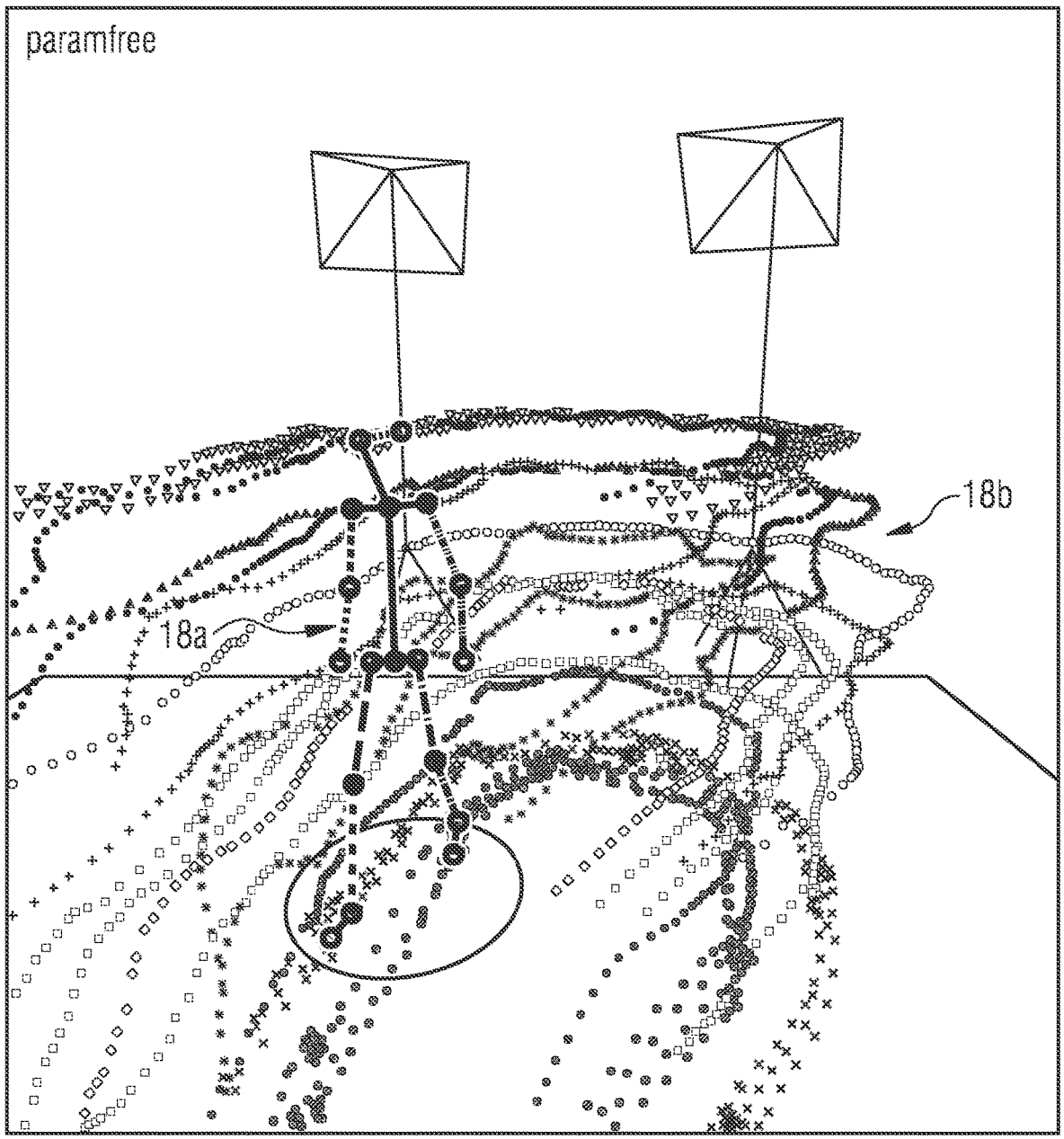
FIG. 10b shows a visualization of movement paths of joints of a skeleton, in addition to a three-dimensional animation of pose-estimation data, after the application of constraints on the lengths of limbs of the skeleton.

As a (not necessarily) final step, the dimensions of the person may be computed (i.e., skeletal length) by computing the mean length of each limb over time. The animation 16; 18a may then be fitted to this skeleton. The new skeleton may be visible in the property editor, as shown in FIG. 10a. By renormalizing the trajectories to fit the new skeleton, a new even better animation may be finally produced, as shown in FIG. 10b. The animation can even be fitted to a completely different skeleton belonging to another person altogether.

The data is now smooth and accurate enough to use for training deep networks. The networks can subsequently be used for human pose-estimation, advanced behavior analysis etc.

Various aspects of the present disclosure thus provide an editor to support 2D to 3D pose generation. Also, the editor may support use of temporal information and allow manual editing of parameters. Optionally, the editor may support editing of parameters to allow a more plausible movement, support a handling of missing frames and/or support handling of incorrect 2D body part inference on individual cameras. The editor may show an animation with edited parameters, and/or show animation of a 3D model.

The proposed editor may thus provide interactivity (via the user interface) and real-time visualization. The editor may be used to perform markerless motion capture. It may allow manual editing of data to produce a motion plausible to the human eye. The result of the editing, and the plausibility of the motion, may be checked in the editor immediately.

The resulting data may be suitable for training machine-learning networks. The generated data may be used for the training of a 3D key point estimation network (e.g., for human pose-estimation, advanced behavior analysis etc.). The improved quality of the training data may lead to improved results of the network.

In various examples, the proposed concept can be extended to analyze the motion of objects, animals, plants etc. Also, the same concept may be used for non-interactive execution without requiring an operator (i.e., automatic, real-time, markerless motion-capture of humans).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A computer-implemented method for generating three-dimensional pose-estimation data, the method comprising:
   obtaining video data of a plurality of cameras, the video data showing a movement of one or more persons, as perceived from a plurality of angles of observation;
   generating two-dimensional pose-estimation data of the one or more persons using a machine-learning model that is suitable for performing two-dimensional pose-estimation based on the video data;
   generating three-dimensional pose-estimation data of the one or more persons based on the two-dimensional pose-estimation data of the one or more persons;
   wherein the two-dimensional and three-dimensional pose-estimation data is defined by one or more points on the body of the one or more persons;
   providing an animation of the movement of the one or more persons by illustrating the movement of the one or more points on the body of the one or more persons overlaid over the video data; and
   providing a user interface for a user to adjust the position of the one or more points on the body of the one or more persons, the user interface being based on the illustration of the movement of the one or more points that is overlaid over the video data.

2. The method according to claim 1, wherein the animation of the movement and/or the user interface is provided after generating the two-dimensional pose-estimation data, after generating the three-dimensional pose-estimation data, and/or after an automatic adjustment of the three-dimensional pose-estimation data.

3. The method according to claim 1, comprising generating a still image showing the position of the one or more points during the movement over time.

4. The method according to claim 1, wherein the user interface provides means for the user to adjust a position of individual points within the two-dimensional or three-dimensional coordinate system.

5. The method according to claim 1, wherein the two-dimensional and three-dimensional pose-estimation data is defined by a position of joints of one or more skeletons in a two-dimensional or three-dimensional coordinate system, the one or more skeletons representing the one or more persons.

6. The method according to claim 5, wherein the joints of the one or more skeletons are interconnected by a plurality of limbs wherein the user interface provides means for the user to adjust at least one of a length, an angle and a position of the plurality of limbs.

7. The method according to claim 1, comprising automatically adjusting, using one or more adjustment algorithms, the three-dimensional pose-estimation data, wherein the animation of the movement of the one or more persons generated after automatically adjusting the three-dimensional pose-estimation data shows an effect of the adjustments performed by the one or more adjustment algorithms.

8. The method according to claim 7, wherein the one or more adjustment algorithms comprise a smoothing algorithm, such as a temporal smoothing algorithm.

9. The method according to claim 7, wherein the two-dimensional and three-dimensional pose-estimation data is defined by a position of joints of one or more skeletons in a two-dimensional or three-dimensional coordinate system, wherein the joints of the one or more skeletons are interconnected by a plurality of limbs, wherein the one or more adjustment algorithms comprise at least one algorithm that is configured to adjust the position of the joints of the limbs based on one or more constraints being applied on the plurality of limbs.

10. The method according to claim 9, wherein the user interface provides means for the user to adjust and/or select the one or more constraints being applied on the plurality of limbs.

11. The method according to claim 9, wherein the one or more constraints comprise at least one constraint that relates to lengths of the plurality of limbs and/or at least one constraint that relates to an angle between limbs.

12. The method according to claim 11, comprising estimating mean lengths of the individual limbs based on the three-dimensional pose-estimation data, wherein the at least one constraint that relates to the lengths of the plurality of limbs is based on the estimated mean lengths of the individual limbs.

13. The method according to claim 1, wherein the method comprises adjusting the training of the machine-learning model that is suitable for performing two-dimensional pose-estimation based on the user-adjusted position of the one or more points.

14. The method according to claim 1, wherein the method comprises training a further machine-learning model based on the video data and based on the three-dimensional pose-estimation data.

15. A data processing apparatus comprising processing circuitry configured to carry out the method according to claim 1.

16. A non-transitory, computer-readable medium comprising a program code for performing the method of claim 1 when the program code is executed on a computer, a processor, processing circuitry, or a programmable hardware component.

* * * * *